United States Patent
Sharma et al.

(10) Patent No.: US 7,283,650 B1
(45) Date of Patent: Oct. 16, 2007

(54) METHOD AND SYSTEM FOR PRINTING OF AUTOMATICALLY CAPTURED FACIAL IMAGES AUGMENTED WITH PROMOTIONAL CONTENT

(75) Inventors: Rajeev Sharma, State College, PA (US); Namsoon Jung, Boalsburg, PA (US)

(73) Assignee: Video Mining Corporation, State College, PA (US)

( * ) Notice: Subject to any disclaimer, the term of this patent is extended or adjusted under 35 U.S.C. 154(b) by 796 days.

(21) Appl. No.: 10/724,302

(22) Filed: Nov. 26, 2003

Related U.S. Application Data

(60) Provisional application No. 60/429,601, filed on Nov. 27, 2002.

(51) Int. Cl.
*G06K 9/00* (2006.01)

(52) U.S. Cl. .................. 382/118; 382/124; 705/14; 358/1.14; 358/1.18

(58) Field of Classification Search ................ 382/118, 382/131, 124; 400/62; 358/1.15; 235/379; 705/14; 364/521
See application file for complete search history.

(56) References Cited

U.S. PATENT DOCUMENTS

| 4,723,212 A | 2/1988 | Mindrum et al. ............ 364/401 |
| 4,833,308 A | 5/1989 | Humble ....................... 235/383 |
| 4,839,507 A | 6/1989 | May ............................ 235/381 |
| 4,896,791 A | 1/1990 | Smith ............................. 221/7 |
| 4,910,672 A | 3/1990 | Off et al. .................... 364/405 |
| 4,949,256 A | 8/1990 | Humble ....................... 364/401 |
| 4,975,960 A | 12/1990 | Petajan ......................... 381/43 |
| 5,012,522 A | 4/1991 | Lambert ........................ 382/2 |
| 5,047,614 A | 9/1991 | Bianco ........................ 235/385 |
| 5,056,019 A | 10/1991 | Schultz et al. .............. 384/405 |

(Continued)

OTHER PUBLICATIONS

U.S. Appl. No. 60/369,279, filed Apr. 2, 2002, Sharma.

(Continued)

*Primary Examiner*—Samir Ahmed
*Assistant Examiner*—Nancy Bitar

(57) ABSTRACT

The present invention is a system and method for printing facial images of people, captured automatically from a sequence of images, onto coupons or any promotional printed material, such as postcards, stamps, promotional brochures, or tickets for movies or shows. The coupon can also be used as a means to encourage people to visit specific sites as a way of promoting goods or services sold at the visited site. The invention is named UCOUPON. A plurality of Computer Vision algorithms in the UCOUPON processes a plurality of input image sequences from one or a plurality of means for capturing images that is pointed at the customers in the vicinity of the system in an uncontrolled background. The coupon content is matched by the customer's demographic information, and primarily, the UCOUPON system does not require any customer input or participation to gather the demographic data, operating fully independently and automatically. The embodiment of the UCOUPON system can be integrated into any public place that requires the usage of coupons, such as existing checkout counters of the retail store environment. The UCOUPON can also be integrated into a stand-alone system, such as a coupon Kiosk system.

16 Claims, 10 Drawing Sheets

U.S. PATENT DOCUMENTS

| | | | |
|---|---|---|---|
| 5,173,851 A | 12/1992 | Off et al. | 364/401 |
| 5,192,854 A | 3/1993 | Counts | 235/375 |
| 5,227,874 A | 7/1993 | Von Kohorn | 358/84 |
| 5,245,533 A | 9/1993 | Marshall | 364/401 |
| 5,283,731 A | 2/1994 | Lalonde et al. | 364/401 |
| 5,309,355 A | 5/1994 | Lockwood | 364/401 |
| 5,331,544 A * | 7/1994 | Lu et al. | 705/10 |
| 5,353,218 A | 10/1994 | De Lapa et al. | 364/401 |
| 5,380,991 A | 1/1995 | Valencia et al. | 235/383 |
| 5,420,606 A | 5/1995 | Begum et al. | 345/156 |
| 5,459,306 A | 10/1995 | Stein et al. | 235/383 |
| 5,500,681 A | 3/1996 | Jones | 348/473 |
| 5,581,064 A | 12/1996 | Riley et al. | 235/383 |
| 5,595,264 A | 1/1997 | Trotta, Jr. | 186/56 |
| 5,612,868 A | 3/1997 | Off et al. | 364/214 |
| 5,665,953 A | 9/1997 | Mazzamuto et al. | 235/383 |
| 5,707,680 A | 1/1998 | Moore | 427/7 |
| 5,708,782 A | 1/1998 | Larson et al. | 395/214 |
| 5,710,886 A | 1/1998 | Christensen et al. | 395/214 |
| 5,715,325 A | 2/1998 | Bang et al. | 382/118 |
| 5,822,735 A | 10/1998 | De Lapa et al. | 705/14 |
| 5,905,246 A | 5/1999 | Fajkowski | 235/375 |
| 6,184,926 B1 | 2/2001 | Khosravi et al. | 348/239 |
| 6,278,979 B1 | 8/2001 | Williams | 705/14 |
| 6,298,329 B1 | 10/2001 | Walker et al. | 705/14 |
| 6,301,370 B1 | 10/2001 | Steffens et al. | 382/103 |
| 6,404,900 B1 | 6/2002 | Qian et al. | 382/103 |
| 6,408,286 B1 | 6/2002 | Heiden | 705/408 |
| 6,483,570 B1 * | 11/2002 | Slater et al. | 355/40 |
| 6,522,772 B1 * | 2/2003 | Morrison et al. | 382/124 |
| 7,062,510 B1 * | 6/2006 | Eldering | 707/104.1 |
| 2002/0107729 A1 * | 8/2002 | Katz | 705/14 |
| 2003/0216967 A1 * | 11/2003 | Williams | 705/14 |
| 2004/0095604 A1 * | 5/2004 | Meyerhofer | 358/1.18 |
| 2006/0039733 A1 * | 2/2006 | Meyerhofer | 400/62 |
| 2006/0235747 A1 * | 10/2006 | Hammond et al. | 705/14 |

OTHER PUBLICATIONS

U.S. Appl. No. 60/399,246, filed Jul. 29, 2002, Sharma.
U.S. Appl. No. 60/402,817, filed Aug. 12, 2002, Sharma.
U.S. Appl. No. 60/409,435, filed Sep. 10, 2002, Sharma.
U.S. Appl. No. 60/421,717, filed Oct. 28, 2002, Sharma.
N. Krahnstoever, S. Kettebekov, M. Yeasin, & R. Sharma, "iMap: A Real-Time Framework for Natural Multimodal Interaction with Large Screen Displays," Dept of Comp. Science and Eng. Technical Report CSE-02-010, Pennsylvania State University, May 2002.
E. Osuna, R. Freund, & F. Girosi, "Training Support Vector Machines: An Application to Face Detection," Proc. IEEE Conf. Computer Vision and Pattern Recognition, pp. 103-136, 1997.
C. Ridder, O. Munkelt, & H. Kirchner, "Adaptive Background Estimation and Foreground Detection using Kalman-Filtering", In Proceedings of International Conference on recent Advances in Mechatronics, ICRAM 95, UNESCO Chair on Mechatronics, 193-199, 1995.
H. Rowley, S. Baluja, and T Kanade, "Neural Network-Based Detection," IEEE Trans. Pattern Analysis and Machine Intelligence, vol. 20, No. 1, pp. 23-28, Jan. 1998.
R. Sharma, V. I. Pavlovic, and T.S. Huang, "Toward Multimodal Human-Computer Interface." Proceedings of the IEEE (Special Issue on Multimedia Computing and Communication) 86(5): 853-869, May 1998.
C. Stauffer & W.E.L. Grimson. Adaptive Background Mixture Models for Real-Time Tracking. In computer Vision and Pattern Recognition, vol. 2, pp. 246-253, Jun. 1999.
M.H. Yang, D.J. Kriegman, & N. Ahuja, "Detecting Faces in Images: A Survey," IEEE Trans. Pattern Analysis and Machine Intelligence, vol. 24, No. 1, Jan. 2002.

* cited by examiner

METHOD AND SYSTEM FOR PRINTING OF AUTOMATICALLY CAPTURED FACIAL IMAGES AUGMENTED WITH PROMOTIONAL CONTENT

CROSS-REFERENCE TO RELATED APPLICATIONS

This application is entitled to the benefit of Provisional Patent Application Ser. No. 60/429,601 filed Nov. 27, 2002

FEDERALLY SPONSORED RESEARCH

Not Applicable

SEQUENCE LISTING OR PROGRAM

Not Applicable

BACKGROUND OF THE INVENTION

1. Field of the Invention

The present invention is a system and method for printing facial images of people, captured automatically from a sequence of image sequences, onto coupons or any promotional printed material, such as postcards, stamps, promotional brochures, or tickets for movies or shows.

2. Background of the Invention

In the prior art, the shortcomings of the conventional paper-based coupon systems are well known, and they can be summarized as follows.

The paper-based coupon system is inefficient because of low coupon redemption rate, which is caused by time-consuming process of keeping and organizing the coupons by customers.

Consumers consider coupons too much trouble to constantly organize and carry around.

Consumers simply forget and leave the coupons at home when they go shopping.

It can be very time-consuming at the coupon redemption point when the cashiers scan the coupons one by one. This problem can be especially aggravated when the customers have many coupons or when there is confusion in verifying the coupons for the effectiveness, such as checking the expiration date.

Significant amount of time is spent between the retailers and manufacturers to clear the coupons.

There exist widespread problems with fraudulent mis-redemption and mal-redemption.

Another disadvantage of the present paper coupon redemption system is that if consumer response to the coupon offer is not what the manufacturer had anticipated and the manufacturer wishes to re-stimulate consumers with a higher coupon discount, the manufacture must publish a whole new set of coupons. The previously printed coupons, therefore, become a largely wasted marketing effort.

It is difficult to track the buying habits of consumers on a national level because those who purchase with cash are not recorded by conventional marketing database collection. The frequent shopper cards on a local level allow demographic and buying history profiles to be compiled on cash purchases, but this has not worked well on the national level.

In order to overcome these shortcomings, many new methods are attempted in the field of invention.

U.S. Pat. No. 5,353,218 of De Lapa et al. disclosed a merchandising system for generating and redeeming product discount coupons, which prints coupons for a selected consumer from a group of consumers by selecting particular coupons from a group of coupons to provide to the selected consumer and printing the coupons. In their system, the coupons generated will be changed to match at least the identity of the consumer and a coupon identification, both of which are encoded on the coupon in machine-readable form. However, in this system, the additional information is obtained by a telephone interview with the consumer or by the consumer completing a survey. The process is conducted indiscriminately for all consumers who wish to participate in the program. However, the method is, without any doubt, a hassle to the customers and time consuming. It also requires labor cost for calling the large number of customers for the telephone interviews.

U.S. Pat. No. 5,380,991 of Valencia et al. disclosed a system and method of allowing a shopper to obtain the benefit of reduced prices for certain items without the necessity of redeeming paper coupons. The system employs an integrated circuit (IC) smart card containing an erasable memory therein. Although this invention overcomes the deficiencies of the prior art by employing a paperless coupon redemption system, thereby avoiding the problems of the prior art in which paper coupons must be distributed by a manufacturer, retained by a customer, brought to a consumer outlet, organized at a checkout station, inspected to determine whether the coupons are expired and then redeemed at a central clearing house, the cost of giving a smart card to each customers will not be realistic at current situation.

In the prior art, such as U.S. Pat. No. 5,173,851 of Off et al. and U.S. Pat. No. 5,612,868 of Off et al., a system and method for generating a printable discount coupon image in response to a customer's action with regard to the purchase of an item in a retail store is well described. U.S. Pat. No. 4,833,308 of Humble disclosed an invention, which is claimed to improve product checkout systems by providing enhanced computer-assisted product checkout and promotion in supermarkets and similar facilities.

U.S. Pat. No. 5,459,306 of Stein et al. disclosed a method and system for delivering product picks to a prospective individual user. Personal user information is gathered. Information on a user's use of a product is gathered, correlated and stored. In their invention, the issues for providing individually targeted promotions and recommendations coupons, predicting a likely purchase for the consumer, not promoting items, which are out of stock, and having a system with complete flexibility in determining when to product a coupon, are mentioned. However, in their disclosure, the method of gathering all the user information is not mentioned.

U.S. Pat. No. 5,665,953 of Mazzamuto et al. disclosed a self-contained personal data collector for redeeming product coupons having product code information in machine-readable form thereon. With the device, the user is able to scan coupons, receive feedback about the corresponding product, and manage the items stored in the scanner device, all by using a self-contained handheld unit. The user can carry the unit around without having to depend on external databases and peripheral devices for data processing and access to detailed product information. This invention is an example of improving the coupon redeeming method and electric device related to the method. Within this invention, the customers are able to get and manage the information about the products interactively and easily, although it is still time-consuming. Since the customers carry the self-contained handheld unit, there is a high chance that the unit can be broken or lost, and it is cumbersome for customers to carry such a device.

U.S. Pat. No. 5,710,886 of Christensen et al. disclosed a method and apparatus for distributing, generating, and redeeming discount coupons, rebate or gift certificates, or the like, tracks each coupon using a consumer ID number printed on the coupon. Coupons may be distributed electronically, such as in the form of diskette or CD-ROM software. They also address a solution for preventing a multiple redemption fraud, which can happen very easily in electric coupon method. However, it is suggested that the telemarketing personnel may request consumer demographic and or identification information, which may be entered into a centralized database.

U.S. Pat. No. 5,905,246 of Fajkowski disclosed an invention, which is related to an apparatus and method of recording, displaying, organizing, transporting, transferring and redeeming coupons and similar items having a bar code or UPC number.

U.S. Pat. No. 6,278,979 of Williams disclosed a system and apparatus for dispensing coupons having selectively printed borders around preferred products. Although this was an attempt to make the coupon look more attractive and have more security feature, thus providing a solution to the coupon fraud, the idea of having just simple borders around the coupon would not be attractive enough as much as it was intended for. Much more attractive and efficient methods for maximizing the promotion of the target product are needed.

U.S. Pat. No. 6,408,286 of Heiden disclosed a postage printing system having a digital coupon distribution system. The postage printing system shows an example of putting advertisement space on the coupon. While this invention is limited to the postage printing system, the embodiment of the invention shown in this document, which is called UCOUPON, can be applied further for any printed material products, such as promotional brochure, stamp, or tickets for movie or show.

Although the disclosed inventions are suggested to overcome the shortcomings of the conventional paper-based coupon system, the quality of the coupon itself has not been improved much and relatively very low attention is drawn to the issue. Thus, it is necessary to come up with a method and apparatus, which improves the quality of the coupon itself in the field of invention. Therefore, one of the main objectives of the UCOUPON is to improve the quality of coupon itself by using the computer vision technologies. The customer face image superimposition onto the product images in UCOUPON can increase the advertisement effect for the product. Seeing oneself in the product might stimulate the customer's desire to buy the product. The customers would not easily throw away coupons with their face images on them. This saves resources from being wasted by maximizing the efficiency of the coupon resources. The superimposition of the customer face image is also found to increase the amusement level to the customers.

In the prior art, the most frequently used method for gathering customer statistics is to use a telephone interview, in which the telemarketing personnel may request consumer demographic and or identification information. Another method is to rely on customer's voluntary input. Although the customer statistics can be gathered through these methods, they are still time consuming and burdensome to the customers. From the manufacturer or retail store side, they also have to spend a lot of financial resources to hire the telemarketing personnel. Therefore, an automatic and non-burdensome way of gathering such information from the consumers is needed. Primarily, the UCOUPON system does not need to require any customer input or participation to gather the demographic data, which can be gathered by computer vision technology, such as gender, age, or ethnicity of the customers, and it operates fully independently and automatically.

With regard to the coupon dispensing system, the UCOUPON can use the well-known methods, which are suggested in the prior arts as described above.

SUMMARY

The UCOUPON detects the face (head) of the customer and superimposes the image on to the coupons in an uncontrolled background. The embodiment of the UCOUPON system can be integrated into any public place that requires the usage of coupons, such as an existing retail store environment. For example, the system can be integrated into checkout counters of the retail store environment. The UCOUPON can also be integrated into a stand-alone system, such as a coupon Kiosk system. The UCOUPON system can be used for a single customer or a plurality of customers per system, as long as the UCOUPON system has enough set of system components. The embodiment of the UCOUPON can also be applied for any coupon or any other printed material products, such as postcards, stamps promotional brochures, or tickets for movies or shows.

Typically, the UCOUPON consists of one or a plurality of means for capturing images, one or a plurality of means for printing coupons and similar printable media, one or a plurality of means for displaying digital contents, and one or a plurality of means for processing and controlling. One or a plurality of means for playing sound and one or a plurality of means for controlling lights can be attached to the UCOUPON system as secondary devices. The means for processing and controlling is connected to the means for capturing images, the means for printing coupons and similar printable media, the means for displaying digital content, the means for playing sound, the means for controlling lights, and other peripheral devices.

The means for capturing images includes a system with one or a plurality of image-capturing devices, such as cameras, frame grabbers and all relevant conventional imaging peripherals, in the UCOUPON. The means for capturing images can be either dynamic or static. The definition of the dynamic means for capturing images is that the means for capturing images should have capability to dynamically adjust all the conventional means for capturing images functionality, such as pan, tilt, zoom, focus, auto-exposure, and white balance, and one or a plurality of the applications in the UCOUPON should be able to control the means for capturing images with these capabilities according to the specific application needs. The definition of the static means for capturing images is that the means for capturing images does not have capability of the dynamic adjustment of the field of view, such as changing the pan and tilt. The static means for capturing images is useful for the applications, in which the constant field of view images are sufficient enough to meet the purpose of the specific applications. The static means for capturing images can usually provide a low cost solution to business.

By default, the UCOUPON system stays in the wait state. The coupon dispensing system communicates with the product database and gets information about the target products, which will tell when to issue the coupons. Once a customer triggers a target product, the customer is detected by the face detection technology in the vicinity of the UCOUPON system, using the means for capturing images. Unlike the retail store integrated UCOUPON, which is triggered by the target product, the stand-alone UCOUPON system can be initiated by the customer appearance. In this embodiment, once a customer appears in the vicinity of the stand-alone UCOUPON system, the customer is detected by the face detection technology.

For the face detection, any robust, reliable, and efficient face detection method can be used. In U.S. Pat. No. 6,184, 926 of Khosravi et al. and U.S. Pat. No. 6,404,900 of Qian et al., the authors disclosed methods for human face detection. In M. H. Yang, D. J. Kriegman, and N. Ahuja, "Detecting Faces in Images: A Survey," IEEE Trans. Pattern Analysis and Machine Intelligence, vol. 24, no. 1, January 2002, the authors describe various approaches for the face detection. In the exemplary embodiment, a neural network based face detector or SVM based face detection method may be used. H. Rowley, S. Baluja, and T., Kanade, "Neural Network-Based Face Detection," IEEE Trans. Pattern Analysis and Machine Intelligence, vol. 20, no. 1, pp. 23-38, January 1998, explains about the neural network based face detector in more details. E. Osuna, R. Freund, and F. Girosi, "Training Support Vector Machines: An Application to Face Detection," Proc. IEEE Conf. Computer Vision and Pattern Recognition, pp. 130-136, 1997 explains about the SVM based face detection approach in more details.

The detection of the face can be done in an uncontrolled background in the UCOUPON system. After a face is detected within the input frame, the face image is superimposed onto the targeted coupon contents and the UCOUPON system prints out the coupon for customers to pick up. The coupon dispensing system communicates with the product database and gets information about the available coupons, promotions, or product advertisement. If there are such available coupons, promotions, or product advertisement, the face image is superimposed onto the targeted coupon contents, which is personalized and matched by the demographic information about the customer.

The UCOUPON coupons enhance the value and quality of coupons. The customer face image superimposition onto the product images can increase the advertisement effect for the product. Seeing oneself in the product might stimulate the customer's desire to buy the product. Customers would not easily throw away coupons with their face images on them. This saves resources from being wasted, thus maximizing the efficiency of the coupon resources. Even after the coupon is expired, there is a high chance that the customers might retain the coupon, possibly as a souvenir, and this could give future and continuous advertisement effects for the products as long as the customer retains the coupon. The coupon can also propagate the advertisement effects among the friends or acquaintance of the customer efficiently, while the person shows it to them because of its novelty or interesting feature. The superimposition of the customer face image is also found to increase the amusement level to the customers.

The coupon contents can be personalized and matched depending on the demographic information about the customers before the coupon is actually printed. For example, if the customer is a female adult, the coupon can be more oriented to the favorites, such as clothing or cosmetics specials of the day, of the corresponding demographic group. The demographic classification module of the UCOUPON system uses the detected face image from the customer to classify the demographic information about the customer. The data gathering services for demographics utilize computer vision technologies to provide visibility to customer traffic, composition, and behavior. This is explained in detail by R. Sharma and A. Castellano, "Method for augmenting transaction data with visually extracted demographics of people using computer vision", U.S. Provisional Patent, 60/402,817, Aug. 12, 2002, and by R. Sharma and T. Castellano, "Automatic detection and aggregation of demographics and behavior of people using computer vision", U.S. Provisional Patent, 60/399,246, Jul. 29, 2002. One example of demographic classification for age is described in detail by R. Sharma, R. Khare, and M. Yeasin, "Methodology and system for automatic age category classification", U.S. Provisional Patent, 60/421,717, Oct. 28, 2002.

The demographic information along with the face images or the signature of the face images can be stored in the customer database. If the customer's record already exists in a customer database, the corresponding data entry is updated by the new data. The customer database can be used to analyze the customer behaviors and provide valuable and important information for the marketing decisions.

After the target coupon is superimposed by the customer's face image, there are two different ways of printing the coupons.

First, the coupon can be printed right away from the means for printing, which is close to the point where the customer's face image is captured and the digital coupon is created. After the coupon is printed, the customer can pick up the coupon. The customer can immediately redeem the coupon in the UCOUPON system. In this case, the coupon can be used as a means to encourage people to visit specific sites as a way of promoting goods or services sold at the visited site, which is managed by the store traffic control scheme. As one of the schemes, the UCOUPON system can ask the customers to redeem the coupon within a fixed duration of time after the coupon is issued. The idea behind this scheme is to advertise other related products on the way in the store, while the customer walks to the designated place to redeem the coupon. The coupon can also be redeemed in the next visit.

Second, the digital coupon can be sent to a remote printer to be printed remotely. In this approach, the UCOUPON system can ask the customers to go to a specific place where the means for printing is and to pick up the coupon within a fixed duration of time after the coupon is issued. The idea behind this scheme is to advertise other related products on the way to pick up the coupon in the store, while the customer walks to the designated place to pick up the coupon. This idea seems to be similar to the idea of advertising the products while the customer tries to redeem the coupon instantly after the coupon is issued, but they are different. One of the differences is that this is enforced by coupon pickup process rather than by the redeeming process. The face image of the customer can be used as the face-based identity at the time of coupon pickup, to see whether the person who picks up the coupon is the right person for the coupon or not. Thus, the customer does not have to carry anything while walking toward the remote coupon pickup place, but just go and show her/his face to claim the coupon.

When the customer leaves the UCOUPON system, the UCOUPON system goes back to the default wait state and restarts the face detection for a new customer within its field of view.

As it is known in the field of invention, the UCOUPON coupon can be printed as a single coupon or a series of coupons. The coupons can have the UPC bar code for fast electronic management of the coupons as described in the prior arts, and the coupons can have the conventional coupon features, known to the prior arts, such as coupon title, product title, and any relevant contents and information to the coupons, such as discount rate and price, expiration date, telephone number for customer service, information with regard to the redemption method and other promotions, advertisement for related products or future products. However, the most important feature is the face image superimposition onto the targeted product images in the UCOUPON coupons. The face image can be superimposed onto various targeted product images, such as the electronic goods, food, clothing, sporting goods, and many others. The customers would not easily throw away coupons with their face images on them, and this superimposition is found to increase the amusement level to the customers.

By default, the UCOUPON system does not require any customer input or participation to gather the demographic data, which can be gathered by computer vision technology, such as gender, age, or ethnicity of the customers, and it operates fully independently and automatically. This is a one-way mode of data collection in the UCOUPON system. The UCOUPON system can also be implemented to operate in an interactive mode, particularly for the stand-alone UCOUPON system, in which if the customer voluntarily wishes to input some data, such as the person's address, telephone number, or e-mail address, the customer can do so using the interface, such as keyboard, mouse, or touch-screen, provided by the UCOUPON system. In case the customer inputs the e-mail address, the UCOUPON system can electronically send the 'face image superimposed coupons' to the e-mail address specified by the customer.

Although the UCOUPON system is integrated into the existing business environment, and thus it can be completely hidden from the general customers, sometimes the means for displaying digital content can be a useful tool for providing rich digital content and advertisement opportunity. This is especially true in the case of the exemplary embodiment of the stand-alone UCOUPON system. In an exemplary embodiment, the means for displaying digital content can include product advertisement video with the targeted product images, which is superimposed by the customer's face image, list of promotional products, and sponsor or manufacturer logos. A content management team of the particular embodiment of the UCOUPON system manages the digital contents, which are highly dependent on the business model of the specific embodiment of the UCOUPON. The customer can look at the rich advertisement content while having fun by seeing her/his face image is superimposed onto the promotional products on the means for displaying digital content.

For the stand-alone UCOUPON, the UCOUPON can also allow the customer in an uncontrolled background interact with the digital content displayed through the means for displaying digital content, using conventional interaction means, such as keyboard, mouse, or touch-screen, which can be found in conventional Kiosk systems. The interaction means can be a contact-free interface using gesture recognition technology, as explained in detail by R. Sharma, N. Krahnstoever, and E. Schapira, "Method and System for Detecting Conscious Hand Movement Patterns and Computer-generated Visual Feedback for Facilitating Human-computer Interaction", U.S. Provisional Patent 60/369,279, Apr. 2, 2002. In this interactive mode, the customer is also able to change the coupon contents, where the person's face image is superimposed, among the promotional coupons given by the manufacturer or the retail store. In the interactive mode, the UCOUPON system can give brief instruction about using the system to the customer.

The UCOUPON can also provide other unique advantages, such as the second demographic data collection at the redemption stage. When a customer comes to redeem the coupons, which were issued earlier, the customer is detected by the face detection technology in the vicinity of the UCOUPON system, using the means for capturing images, and the coupon dispensing system communicates with the product database and gets information about the coupons, such as to see whether they are legitimate or not. For example, the customer and coupon-matching module can verify the legitimacy of the coupon redemption, thus preventing some of the problems in the paper-based conventional coupon redemption systems, such as coupon fraud, duplicate redemption of the same coupon to the same customer, or inefficiency of issuing coupons to the second time customer (not new customer). A new coupon can also be issued to further promote products to the customers at the redemption stage.

The demographic classification module of the UCOUPON system uses the detected face image from the customer to classify the demographic information about the customer at this coupon redemption stage also, and the information along with the face images or the signature of the face images can be stored in the customer database, as it was done for the first demographic data collection.

Through this second stage of demographics data collection, the UCOUPON can gather information about the customers and their behavior, which cannot be gathered in any other conventional data collection method. For example, the prior art method for data collection is possible only for returning customers, i.e. only data for the customers who redeem the coupons can be gathered. However, with the UCOUPON system, the information about those, who do not redeem the coupons, can also be gathered, by comparing the first data collection information, which was gathered in the first stage of coupon dispensing as the customer purchases products, and the second data collection information for the returning customers, who come to redeem the coupons. As another example, the redeem rate among different demographic groups, such as among different age groups, can be known through the data collection in UCOUPON.

DRAWINGS

Figures

DETAILED DESCRIPTION OF THE INVENTION

Figure 1:
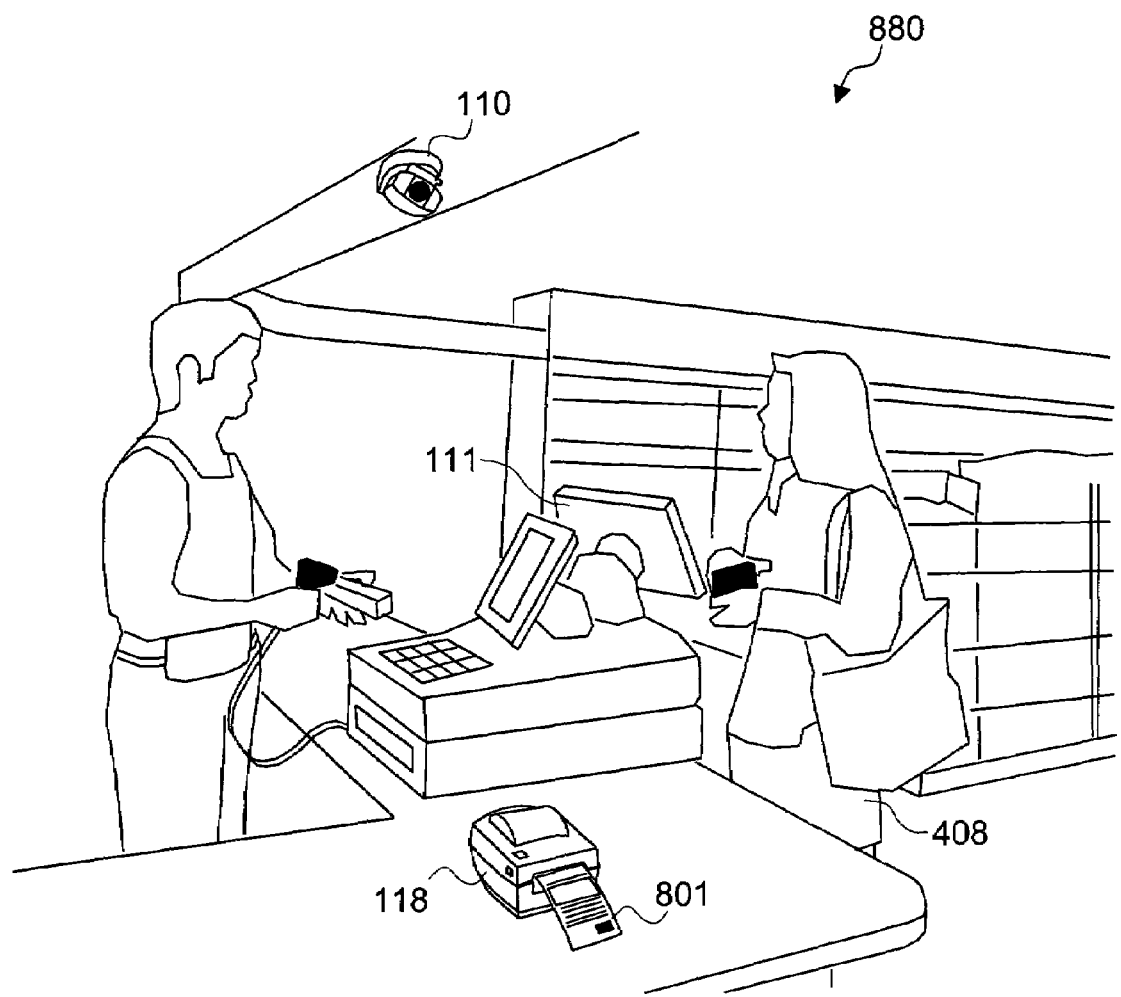
FIG. 1 is an overall view of a preferred embodiment of the UCOUPON as a store-integrated system.
Figure 2:
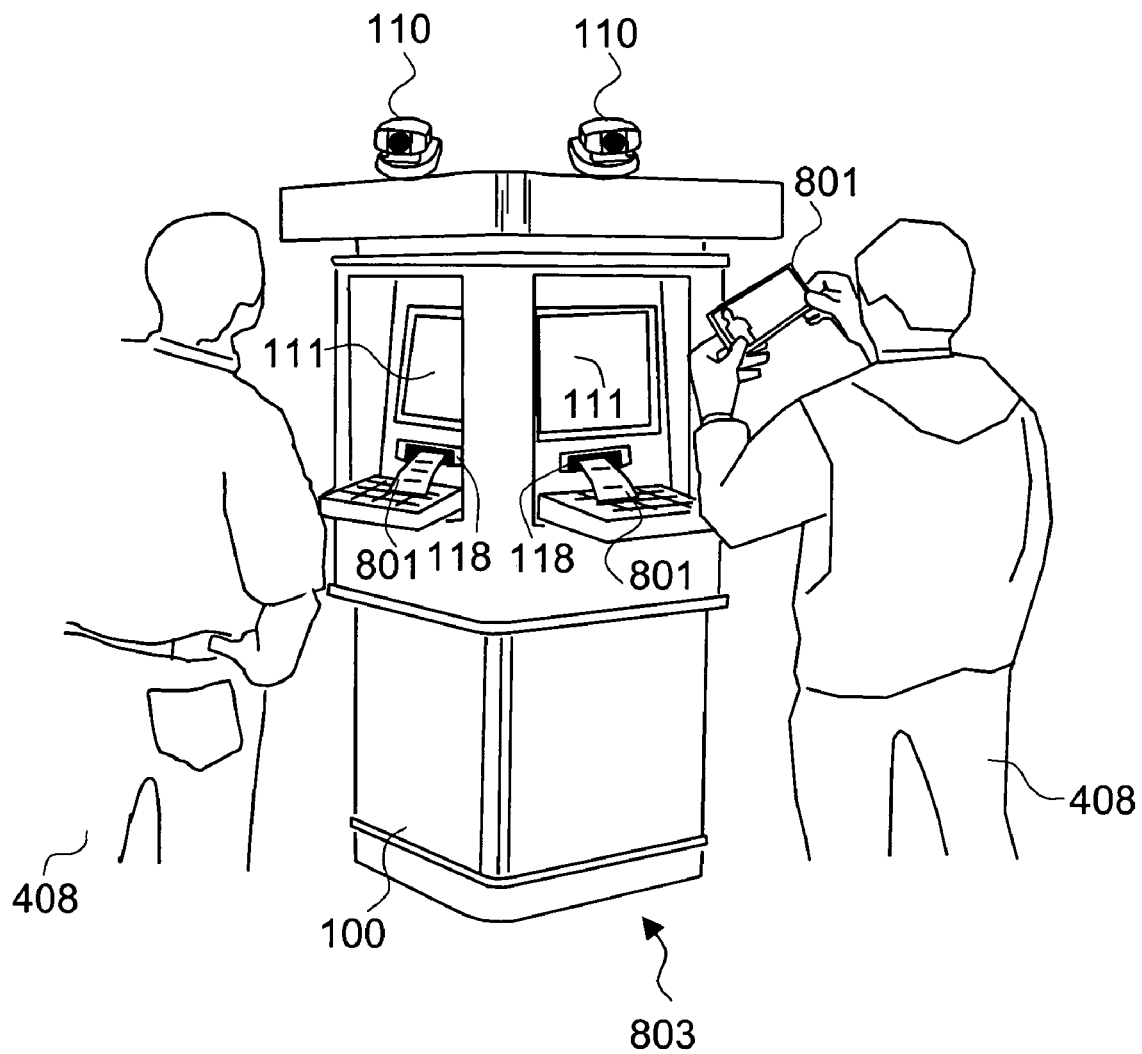
FIG. 2 is an overall view of another preferred embodiment of the UCOUPON as a stand-alone system.
Figure 3:
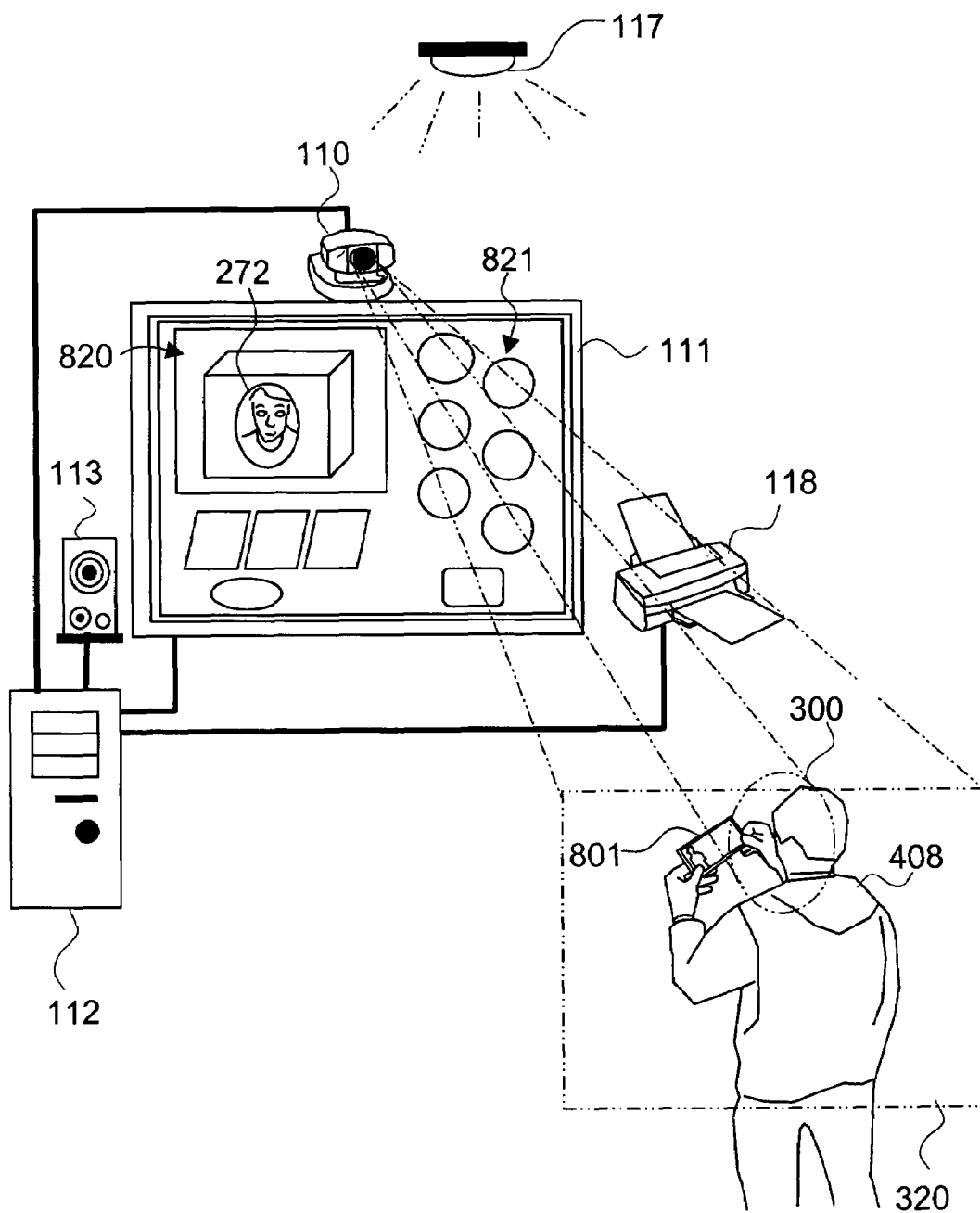
FIG. 3 is an overall view of the UCOUPON system components.

FIG. 1 is an overall view of a preferred embodiment of the UCOUPON as a store-integrated system. FIG. 2 is an overall view of another preferred embodiment of the UCOUPON as a stand-alone system. FIG. 3 is an overall view of the UCOUPON system components.

The UCOUPON system can be integrated into any public place that requires the usage of coupons. The embodiment of the UCOUPON can also be applied for any coupon or any other printed material products, such as postcards, stamps, promotional brochures, or tickets for movies or shows. In the exemplary embodiment shown in FIG. 1, the UCOUPON is integrated into an existing retail store environment 880. Although only one set of UCOUPON system components is shown in FIG. 1, the UCOUPON can be integrated into checkout counters of the retail store environment 880. The UCOUPON system can also be installed next to products as a small sized system, and the coupon printing can be implemented through the network printer, so that customers can pick up the coupons at the checkout time.

In this particular exemplary embodiment shown in FIG. 1, the UCOUPON consists of one or a plurality of means for capturing images 110, one or a plurality of means for printing coupons 118 and similar printable media, and one or a plurality of means for processing and controlling 112. One or a plurality of means for displaying digital contents 111 and one or a plurality of means for playing sound 113 (hidden in the exemplary embodiment of FIG. 1) can be attached to the UCOUPON system as secondary means. The means for processing and controlling 112 is hidden in the exemplary embodiment shown in FIG. 1, and it can be installed in any place in the retail store area, such as under the check-out counter or in the retail store office, as long as it can be connected to the other relevant means conveniently, securely, and efficiently.

In the exemplary embodiment shown in FIG. 2, the UCOUPON can be integrated into a stand-alone system 803, such as a coupon Kiosk system. As in the exemplary embodiment shown in FIG. 2, the stand-alone UCOUPON system can be used for a single customer or a plurality of customers, as long as the UCOUPON system has enough set of system components. In this particular exemplary embodiment shown in FIG. 2, the UCOUPON consists of one or a plurality of means for capturing images 110, one or a plurality of means for printing coupons 118 and similar printable media, one or a plurality of means for displaying digital contents 111, and one or a plurality of means for processing and controlling 112. One or a plurality of means for playing sound 113 and one or a plurality of means for controlling lights 117 (both hidden in the exemplary embodiment of FIG. 2) can be attached to the UCOUPON system as secondary devices. The means for processing and controlling 112 can be installed inside a housing 100 as in the exemplary embodiment shown in FIG. 2.

The means for processing and controlling 112 is connected to the sub-systems, such as the means for capturing images 110, the means for printing coupons 118 and similar printable media, the means for displaying digital contents 111, the means for playing sound 113, the means for controlling lights 117, and other peripheral devices as in the exemplary embodiment shown in FIG. 3. This applies to the exemplary embodiments shown in FIG. 1 and FIG. 2.

The means for capturing images 110 includes a system with one or a plurality of image-capturing devices, such as cameras, frame grabbers and all relevant conventional imaging peripherals, in the UCOUPON. The means for capturing images 110 can be either dynamic or static. The definition of the dynamic means for capturing images is that the means for capturing images should have capability to dynamically adjust all the conventional means for capturing images functionality, such as pan, tilt, zoom, focus, auto-exposure, and white balance, and one or a plurality of the applications in the UCOUPON should be able to control the means for capturing images with these capabilities according to the specific application needs.

The definition of the static means for capturing images is that the means for capturing images does not have capability of the dynamic adjustment of the field of view 320, such as changing the pan and tilt. The static means for capturing images is useful for the applications, in which the constant field of view images are sufficient enough to meet the purpose of the specific applications. The static means for capturing images can usually provide a low cost solution to business.

The means for displaying digital contents 111 in the UCOUPON can be an efficient tool to attract people and to provide visual feedback to the customer 408, especially while the person interacts with the visual objects on the screen in the embodiment of the stand-alone UCOUPON system. The means for controlling lights 117, as shown in FIG. 3, helps the UCOUPON to process the customer detection and coupon printing by helping computer vision technology operates more reliably. The means for controlling lights 117 is not the essential part of the UCOUPON, but they belong to the UCOUPON as an environmental set up, in a broader concept. The means for playing sound 113 can be used for playing the audio content, attracting the customer 408 to the system, announcing important messages (such as promotions), giving the instructions to the customer 408, and giving the audio feedback during the interaction.

In the exemplary embodiment shown in FIG. 3, a camera, such as the Sony EVI-D30, and frame grabber, such as the Matrox Meteor II frame grabber, may be used as the means for capturing images 110 if dynamic control is needed. A firewire camera, such as the Pyro 1394 web cam by ADS technologies or iBOT FireWire Desktop Video Camera by OrangeMicro, or a USB camera, such as the QuickCam Pro 3000 by Logitech, may be used as the means for capturing images 110 if dynamic control of the field of view is not needed and the static input images are sufficient enough to process the customer detection and printing the coupons in the UCOUPON. A plurality of such means for capturing images 110 can be used for multiple processing for multiple customers in the exemplary embodiment shown in FIG. 3 and FIG. 2.

A large display screen, such as the Sony LCD projection data monitor model number KL-X9200U, may be used as the output means for displaying digital contents 111 in the exemplary embodiments. Any conventional computer monitor or television screen, which exists in current business environment, can be used as the output means for displaying digital contents 111 in the exemplary embodiments. A computer system, such as the Dell Precision 420, with processors, such as the dual Pentium 864 Mhz microprocessors, and with memory, such as the Samsung 512 MB DRAM, may be used as the means for processing and controlling 112 in the exemplary embodiment. The means for processing and controlling 112 may process the interaction between the UCOUPON and the customer 408, in case customer input is gathered. Any appropriate means for playing sound 113 can be used for the invention. In the exemplary embodiment, the Harman/Kardon multimedia speaker system may be used as the means for playing sound 113. The UCOUPON can place the normal speakers inside the housing 100 or anywhere in the business area, from which the customer can hear the sound well. A subwoofer speaker can be hidden anywhere in the housing 100 also. Usually the best place for the subwoofer speaker is the bottom-most and farthest corner of the room from the listener. Any appropriate means for controlling lights 117 can be used for the invention. The means for controlling lights 117 can use any conventional lighting devices, and it is preferable to use diffused lighting. The lighting is mounted so that it does not direct light into the customer's eyes yet illuminate the face of the customer 408. The means for controlling lights 117 can be mounted on the front of the housing 100 unit, overhead of the housing 100 unit using lighting tubes, or on the ceiling in the business area.

The processing software and application may be written in a high-level computer programming language, such as C++, and a compiler, such as Microsoft Visual C++, may be used for the compilation in the exemplary embodiment. Image creation and modification software, such as Adobe Photoshop, may be used for creating the digital contents in the exemplary embodiment.

As in the exemplary embodiment shown in FIG. 1, the UCOUPON can detect the face (head) of the customer and superimpose the image on to the coupons in an uncontrolled background.

For the stand-alone UCOUPON, as in the exemplary embodiment shown in FIG. 2, the UCOUPON can also allow the customer 408 in an uncontrolled background interact with the digital content displayed through the means for displaying digital contents 111, using conventional interaction means, such as keyboard, mouse, or touch-screen, which can be found in conventional Kiosk. For the stand-alone UCOUPON, as in the exemplary embodiment shown in FIG. 2, the UCOUPON can also allow the customer 408 in an uncontrolled background interact with the digital contents, using the contact-free interface. The contact-free interface can be implemented using any of the reliable real-time gesture recognition technology in the computer vision. One example of the contact-free interface is explained in detail by R. Sharma, N. Krahnstoever, and E. Schapira, "Method and System for Detecting Conscious Hand Movement Patterns and Computer-generated Visual Feedback for Facilitating Human-computer Interaction", U.S. Provisional Patent 60/369,279, Apr. 2, 2002.

The detection of the face can be done in an uncontrolled background in the UCOUPON system. The UCOUPON system superimposes 272 the customer's face (head) image onto graphical objects and prints them on coupons 801, which enhances the value and quality of coupons. The customer face image superimposition onto the product images can increase the advertisement effect for the product. Seeing oneself in the product might stimulate the customer's desire to buy the product. The customers would not easily throw away coupons with their face images on them. This saves resources from being wasted by maximizing the efficiency of the coupon resources. Even after the coupon is expired, there is a high chance that the customers might retain the coupon, possibly as a souvenir, and this could give future and continuous advertisement effects for the products as long as the customer retains the coupon. The coupon can also propagate the advertisement effects among the friends or acquaintance of the customer efficiently, while the person shows it to them because of its novelty or interesting feature. The superimposition of the customer face image is also found to increase the amusement level to the customers.

Figure 4:
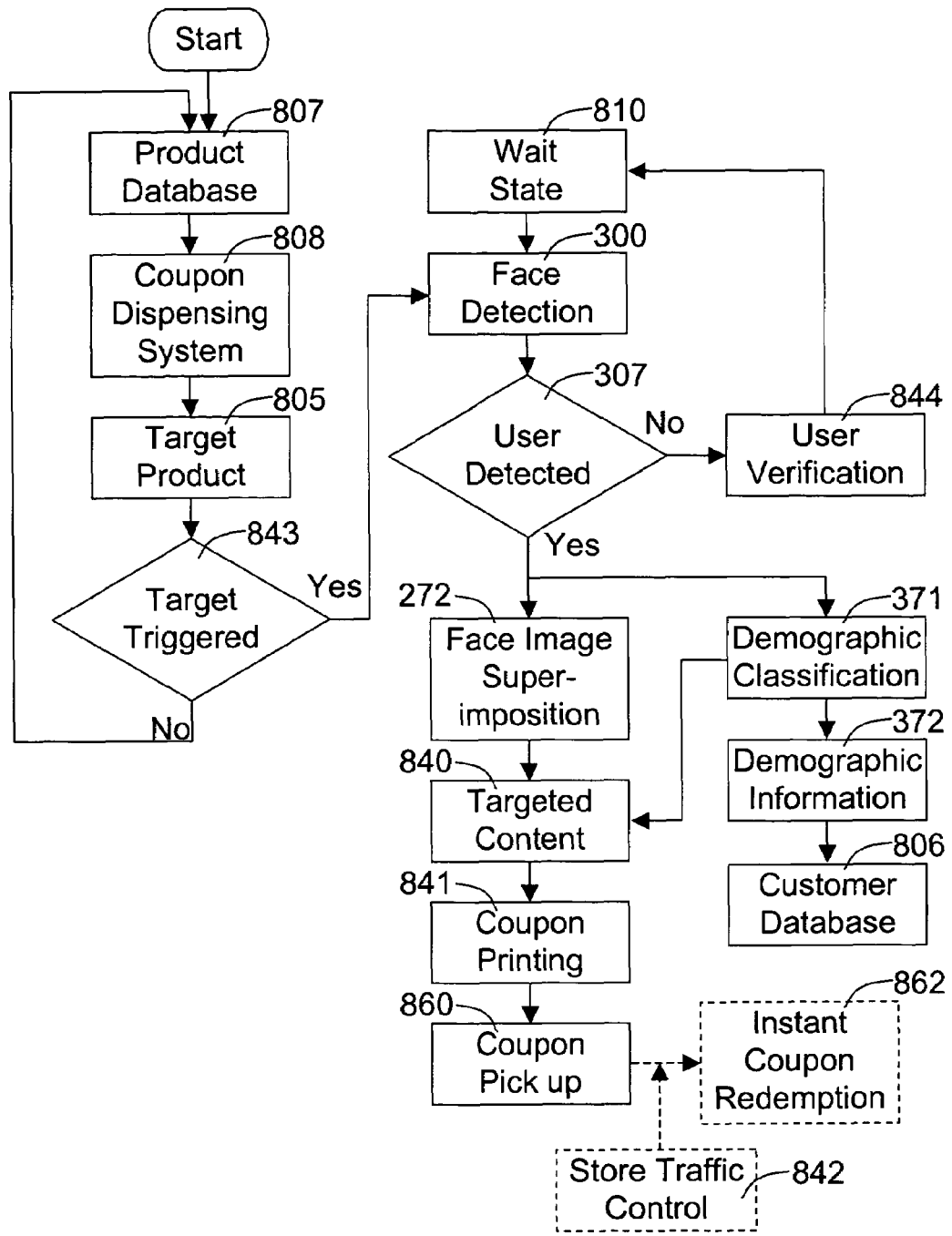
FIG. 4 is a state diagram of processes for the first demographic data collection, the enhanced (targeted) coupon printing, and the coupon dispensing in an exemplary embodiment of the UCOUPON as a store-integrated system.

FIG. 4 is a state diagram of processes for the first demographic data collection, the enhanced (targeted) coupon printing, and the coupon dispensing in an exemplary embodiment of the UCOUPON as a store-integrated system.

By default, the UCOUPON system stays in the wait state 810. The coupon dispensing system 808 communicates with the product database 807 and gets information about the target products 805, which will tell when to issue the coupons. Once a target product 805 is triggered 843 by a customer 408, the customer 408 is detected 307 by the face detection 300 technology in the vicinity of the UCOUPON system, using the means for capturing images 110. For the face detection 300, any robust, reliable, and efficient face detection method can be used. In U.S. Pat. No. 6,184,926 of Khosravi et al. and U.S. Pat. No. 6,404,900 of Qian et al., the authors disclosed methods for human face detection. In M. H. Yang, D. J. Kriegman, and N. Ahuja, "Detecting Faces in Images: A Survey," IEEE Trans. Pattern Analysis and Machine Intelligence, vol. 24, no. 1, January 2002, the authors describe various approaches for the face detection. In the exemplary embodiment, a neural network based face detector or SVM based face detection method may be used. H. Rowley, S. Baluja, and T. Kanade, "Neural Network-Based Face Detection," IEEE Trans. Pattern Analysis and Machine Intelligence, vol. 20, no. 1, pp. 23-38, January 1998, explains about the neural network based face detector in more details. E. Osuna, R. Freund, and F. Girosi, "Training Support Vector Machines: An Application to Face Detection," Proc. IEEE Conf. Computer Vision and Pattern Recognition, pp. 130-136, 1997 explains about the SVM based face detection approach in more details.

After a face is detected within the input frame, the face image is superimposed 272 onto the targeted coupon contents 840. If the face detector fails to detect the customer face by any reason, the UCOUPON system can verify 844 the input image again and re-enforce the face detection 300.

The targeted coupon contents 840 can be personalized and matched depending on the demographic information 372 about the customers. For example, if the customer is a female adult, the coupon can be more oriented to the favorites, such as clothing or cosmetics specials of the day, of the corresponding demographic group. The demographic classification module of the UCOUPON system uses the detected face image from the customer 408 to classify 371 the demographic information 372 about the customer. The data gathering services for demographics utilize computer vision technologies to provide visibility to customer traffic, composition, and behavior. This is explained in detail by R. Sharma and A. Castellano, "Method for augmenting transaction data with visually extracted demographics of people using computer vision", U.S. Provisional Patent, 60/402, 817, Aug. 12, 2002, and by R. Sharma and T. Castellano, "Automatic detection and aggregation of demographics and behavior of people using computer vision", U.S. Provisional Patent, 60/399,246, Jul. 29, 2002. One example of demographic classification for age is described in detail by R. Sharma, R. Khare, and M. Yeasin, "Methodology and system for automatic age category classification", U.S. Provisional Patent, 60/421,717, Oct. 28, 2002.

The demographic information along with the face images or the signature of the face images can be stored in the customer database 806. If the customer's record already exists in a customer database 806, the corresponding data entry is updated by the new data. The customer database 806 can be used to analyze the customer behaviors and provide valuable and important information for the marketing decisions.

Figure 8:
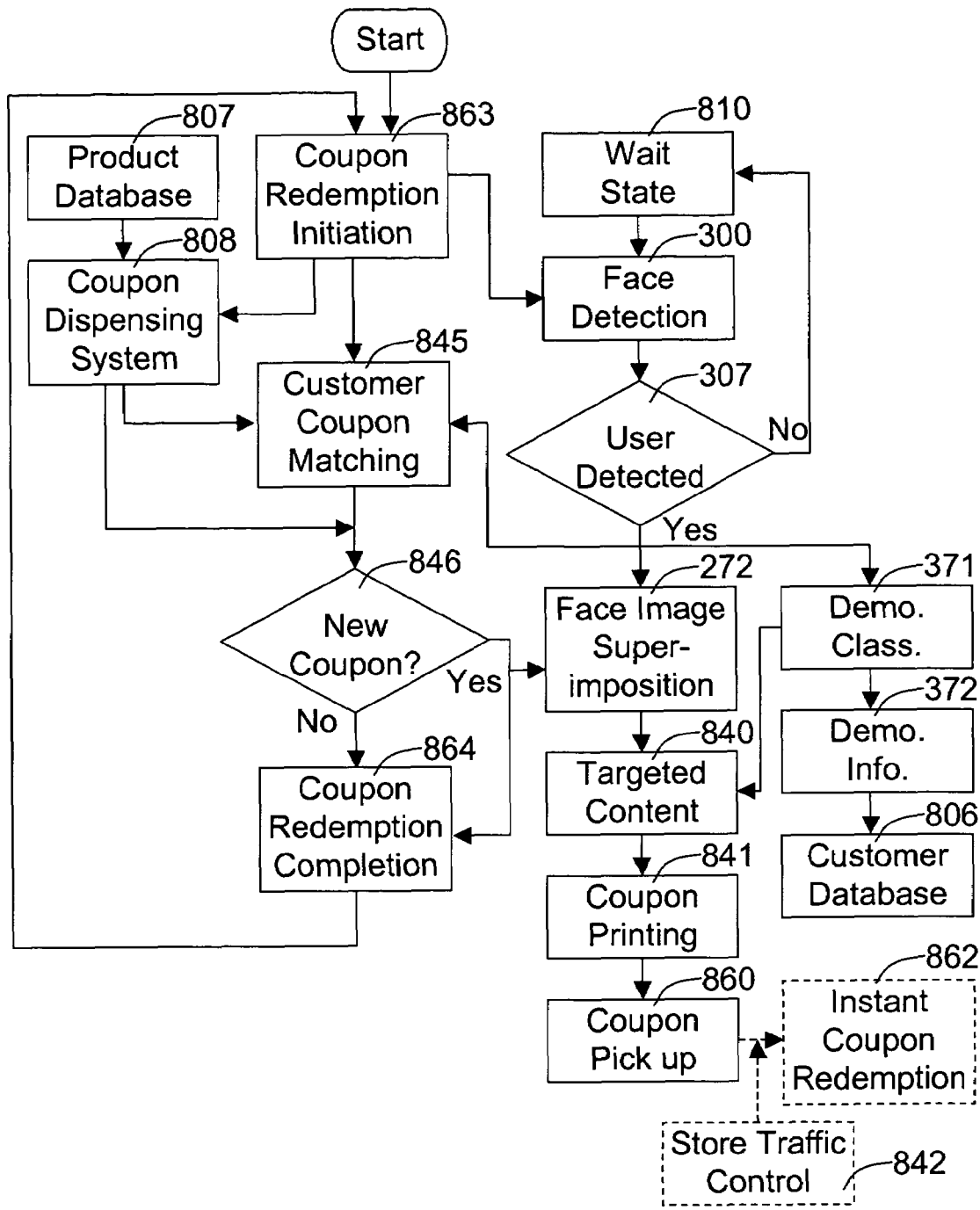
FIG. 8 is a state diagram of processes for the coupon redemption and the second demographic data collection in an exemplary embodiment of the UCOUPON.

After the coupon is printed 841, the customer 408 can pick up 860 the coupon. The customer can immediately redeem the coupon 862 in the UCOUPON system. In this case, the coupon can be used as a means to encourage people to visit specific sites as a way of promoting goods or services sold at the visited site, which is managed by the store traffic control 842 scheme. As one of the schemes, the UCOUPON system can ask the customers to redeem the coupon within a fixed duration of time after the coupon is issued. The idea behind this scheme is to advertise other related products on the way in the store, while the customer walks to the designated place to redeem the coupon. The coupon can be redeemed in the next visit, and an exemplary embodiment of coupon redemption of the UCOUPON is shown in FIG. 8.

The UCOUPON system does not require any customer input or participation to gather the demographic data, and it operates fully independently and automatically. In this one-way mode, the UCOUPON system distributes the coupons according to the business plan of the manufacturer or retail store and gathers the customer demographic data, which can be gathered by computer vision technology, such as gender, age, or ethnicity of the customers, without requesting input from the customers.

Figure 5:
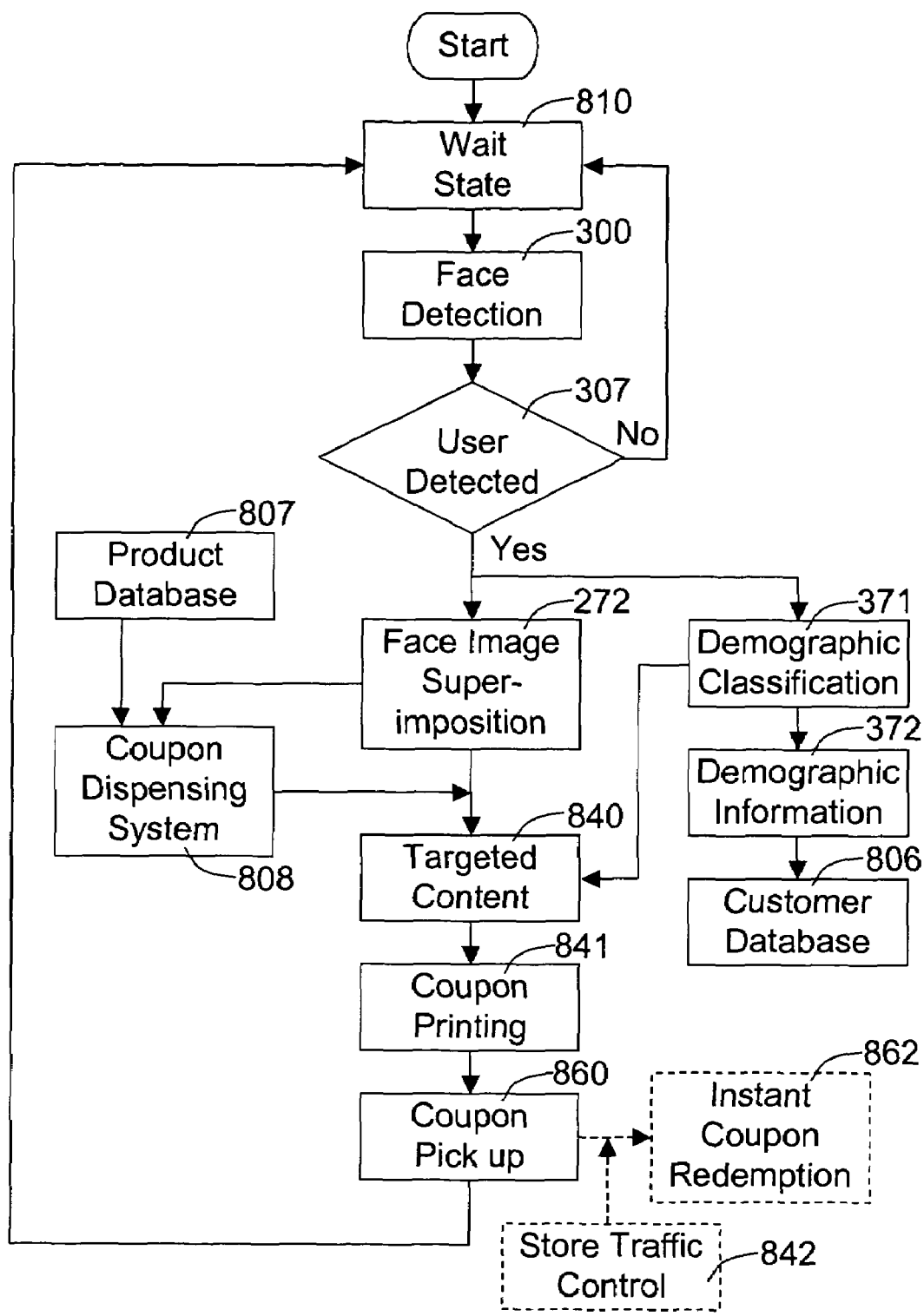
FIG. 5 is a state diagram of processes for the first demographic data collection, the enhanced (targeted) coupon printing, and the coupon dispensing in another exemplary embodiment of the UCOUPON as a stand-alone system.

FIG. 5 is a state diagram of processes for the first demographic data collection, the enhanced (targeted) coupon printing, and the coupon dispensing in another exemplary embodiment of the UCOUPON as a stand-alone system.

By default, the UCOUPON system stays in the wait state 810. Once a customer 408 appears in the vicinity of the stand-alone UCOUPON system, the customer 408 is detected 307 by the face detection 300 technology. For the face detection 300, any robust, reliable, and efficient face detection method can be used as described for the exemplary embodiment shown in FIG. 4. The coupon dispensing system 808 communicates with the product database 807 and gets information about the available coupons, promotions, or product advertisement. If there are such available coupons, promotions, or product advertisement, the face image is superimposed 272 onto the targeted coupon contents 840.

The targeted coupon contents 840 can be personalized and matched depending on the demographic information 372 about the customers. For example, if the customer is a female adult, the coupon can be more oriented to the favorites, such as clothing or cosmetics specials of the day, of the corresponding demographic group. The demographic classification module of the UCOUPON system uses the detected face image from the customer 408 to classify 371 the demographic information 372 about the customer. The data gathering services for demographics utilize computer vision technologies to provide visibility to customer traffic, composition, and behavior. This is explained in detail by R. Sharma and A. Castellano, "Method for augmenting transaction data with visually extracted demographics of people using computer vision", U.S. Provisional Patent, 60/402,817, Aug. 12, 2002, and by R. Sharma and T. Castellano, "Automatic detection and aggregation of demographics and behavior of people using computer vision", U.S. Provisional Patent, 60/399,246, Jul. 29, 2002. One example of demographic classification for age is described in detail by R. Sharma, R. Khare, and M. Yeasin, "Methodology and system for automatic age category classification", U.S. Provisional Patent, 60/421,717, Oct. 28, 2002.

The demographic information along with the face images or the signature of the face images can be stored in the customer database 806. If the customer's record already exists in a customer database 806, the corresponding data entry is updated by the new data. The customer database 806 can be used to analyze the customer behaviors and provide valuable and important information for the marketing decisions.

After the coupon is printed 841, the customer 408 can pick up 860 the coupon. If the customer 408 leaves the UCOUPON system after picking up 860 the coupons, the coordinate of the face image goes out of the boundary of the field of view 320 of the means for capturing images 110, and the UCOUPON system goes back to the default wait state 810, and it restarts the face detection 300 for a new customer 408 within its field of view 320.

The customer can immediately redeem the coupon 862 in the UCOUPON system. In this case, the coupon can be used as a means to encourage people to visit specific sites as a way of promoting goods or services sold at the visited site, which is managed by the store traffic control 842 scheme. As one of the schemes, the UCOUPON system can ask the customers to redeem the coupon within a fixed duration of time after the coupon is issued. The idea behind this scheme is to advertise other related products on the way in the store, while the customer walks to the designated place to redeem the coupon. The coupon can be redeemed in the next visit, and an exemplary embodiment of coupon redemption of the UCOUPON is shown in FIG. 8.

Normally, the UCOUPON system does not require any customer input or participation, and it operates fully independently and automatically. In this one-way mode, the UCOUPON system distributes the coupons according to the business plan of the manufacturer or retail store and gathers the customer demographic data, which can be gathered by computer vision technology, such as gender, age, or ethnicity of the customers, without requesting input from the customers.

However, it can also be implemented to operate in an interactive mode, in which if the customer voluntarily wishes to input some data, such as the person's address, telephone number, or e-mail address, the customer can do so using the interface, such as keyboard, mouse, or touchscreen, provided by the stand-alone UCOUPON system. In case the customer inputs the e-mail address, the UCOUPON system can electronically send the 'face image superimposed coupons' to the e-mail address specified by the customer. The UCOUPON can also allow the customer 408 in an uncontrolled background interact with the digital contents, using the contact-free interface, as described in the exemplary embodiment shown in FIG. 2. In this interactive mode, the customer is also able to change coupon contents, where the person's face image is superimposed 272, among the promotional coupons given by the manufacturer or the products or retail store. In the interactive mode, the UCOUPON system can give brief instruction about using the system to the customer 408.

Figure 6:
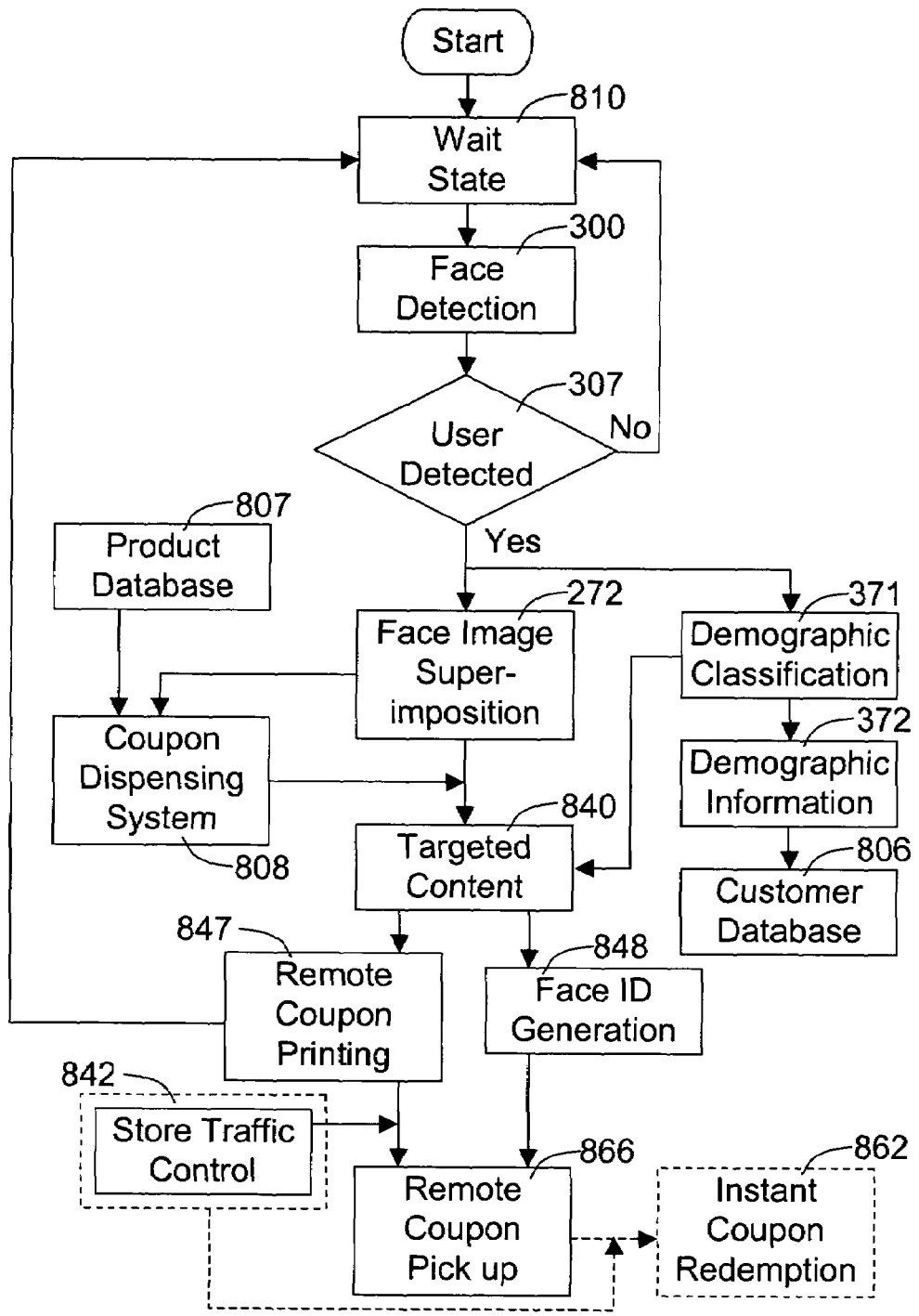
FIG. 6 is a state diagram of processes for the first demographic data collection, the remote coupon printing, and the remote coupon dispensing in still another exemplary embodiment of the UCOUPON.
Figure 7:
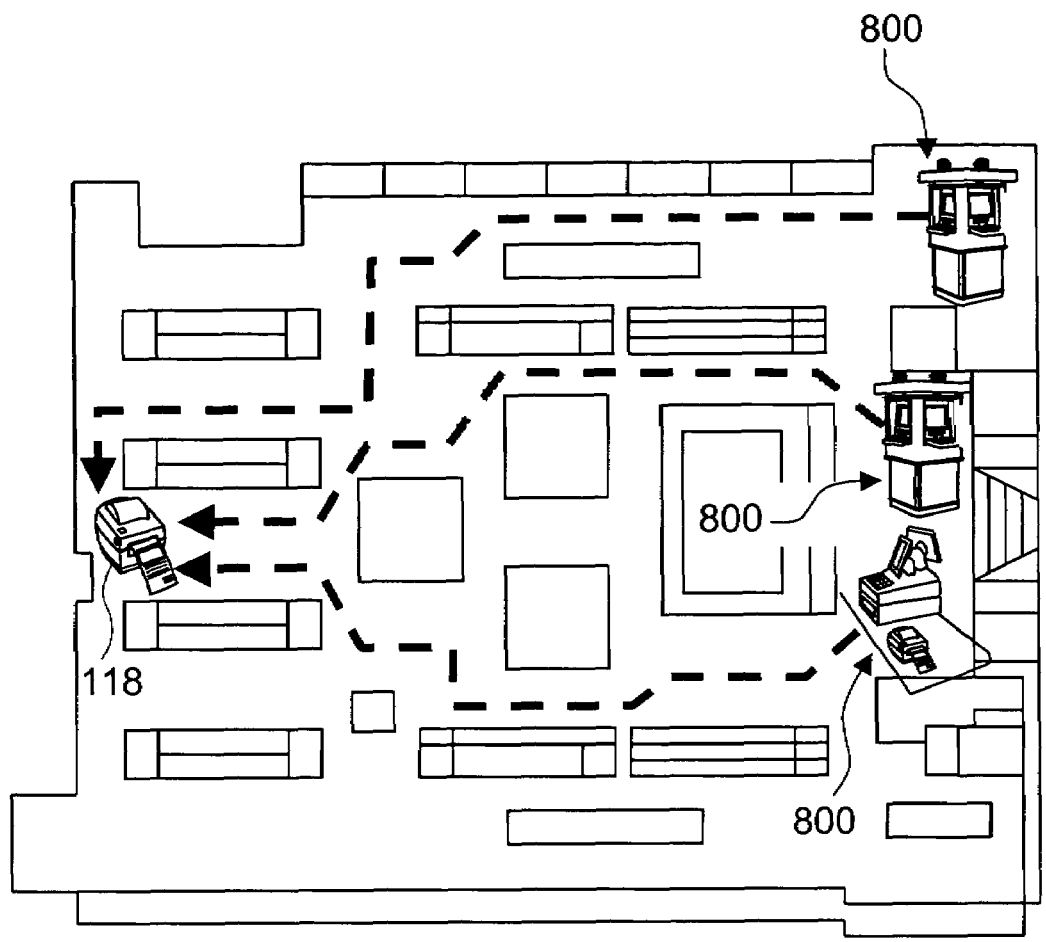
FIG. 7 shows an exemplary traffic flow for the remote coupon printing with a plurality of means for printing in a store by the UCOUPON.

FIG. 6 is a state diagram of processes for the first demographic data collection, the remote coupon printing, and the remote coupon dispensing in still another exemplary embodiment of the UCOUPON. FIG. 7 shows an exemplary traffic flow for the remote coupon printing with a plurality of means for printing in a store by the UCOUPON.

The exemplary embodiment shown in FIG. 6 can be applied to both store-integrated UCOUPON system and stand-alone UCOUPON system. By default, the UCOUPON system stays in the wait state 810. Once a customer 408 appears in the vicinity of the UCOUPON system, the customer 408 is detected 307 by the face detection 300 technology. For the face detection 300, any robust, reliable, and efficient face detection method can be used as described for the exemplary embodiment shown in FIG. 4. The coupon dispensing system 808 communicates with the product database 807 and gets information about the available coupons, promotions, or product advertisement. If there are such available coupons, promotions, or product advertisement, the face image is superimposed 272 onto the targeted coupon contents 840.

The targeted coupon contents 840 can be personalized and matched depending on the demographic information 372 about the customers. For example, if the customer is a female adult, the coupon can be more oriented to the favorites, such as clothing or cosmetics specials of the day, of the corresponding demographic group. The demographic classification module of the UCOUPON system uses the detected face image from the customer 408 to classify 371 the demographic information 372 about the customer. The data gathering services for demographics utilize computer vision technologies to provide visibility to customer traffic, composition, and behavior. This is explained in detail by R. Sharma and A. Castellano, "Method for augmenting transaction data with visually extracted demographics of people using computer vision", U.S. Provisional Patent, 60/402,817, Aug. 12, 2002, and by R. Sharma and T. Castellano, "Automatic detection and aggregation of demographics and behavior of people using computer vision", U.S. Provisional Patent, 60/399,246, Jul. 29, 2002. One example of demographic classification for age is described in detail by R. Sharma, R. Khare, and M. Yeasin, "Methodology and system for automatic age category classification", U.S. Provisional Patent, 60/421,717, Oct. 28, 2002.

The demographic information along with the face images or the signature of the face images can be stored in the customer database 806. If the customer's record already exists in a customer database 806, the corresponding data entry is updated by the new data. The customer database 806 can be used to analyze the customer behaviors and provide valuable and important information for the marketing decisions.

After the target coupon is superimposed 272 by the customer's face image, the digital coupon can be sent to a remote printer to be printed remotely 847. In the exemplary embodiments shown in FIG. 6, the UCOUPON system can ask the customers 408 to go to a specific place where the means for printing coupons 118 is and to follow remote coupon pickup 866 process within a fixed duration of time after the coupon is issued. The idea behind this scheme is to advertise other related products on the way to pick up the coupon in the store, while the customer walks to the designated place to pick up the coupon. This idea seems to be similar to the idea of advertising the products while the customer tries to redeem the coupon instantly after the coupon is issued, as described in the exemplary embodiments shown in FIG. 4 and FIG. 5, but they are different. One of the differences is that this is enforced by coupon pickup process rather than by the redeeming process. The face image of the customer can be used for the face-based ID generation 848 at the time of coupon pickup, to see whether the person who picks up the coupon is the right person for the coupon or not. Thus, the customer does not have to carry anything while walking toward the remote coupon pickup place, but just go and show her/his face to claim the coupon.

An exemplary embodiment of such traffic flow for the remote coupon printing is shown in FIG. 7. A plurality of UCOUPON systems 800 can be connected to a centralized means for printing coupons 118 as shown in the exemplary embodiment of traffic flow in FIG. 7. In the exemplary embodiment shown in FIG. 7, the UCOUPON system can be either store-integrated UCOUPON system, or stand-alone UCOUPON system, or both. The idea of having a centralized means for printing could reduce the cost of having multiple means for printing and difficulties of maintaining the means for printing.

If the customer 408 leaves the UCOUPON system, the coordinate of the face image goes out of the boundary of the field of view 320 of the means for capturing images 110, and the UCOUPON system goes back to the default wait state 810, and it restarts the face detection 300 for a new customer 408 within its field of view 320.

FIG. 8 is a state diagram of processes for the coupon redemption and the second demographic data collection in an exemplary embodiment of the UCOUPON.

By default, the UCOUPON system stays in the wait state 810. When a customer 408 starts coupons redemption initiation 863 process, which were issued earlier, the customer 408 is detected 307 by the face detection 300 technology in the vicinity of the UCOUPON system, using the means for capturing images 110, and the coupon dispensing system 808 communicates with the product database 807 and gets information about the coupons, such as to see whether they are legitimate or not. For example, the customer and coupon-matching module 845 can verify the legitimacy of the coupon redemption, thus preventing some of the problems in the paper-based conventional coupon redemption systems, such as coupon fraud, duplicate redemption of the same coupon to the same customer, or inefficiency of issuing coupons to the second time customer (not new customer). For the face detection 300, any robust, reliable, and efficient face detection method can be used as described for the exemplary embodiment shown in FIG. 4.

Meanwhile, the UCOUPON system communicates with the coupon dispensing system 808 and decides whether to issue a new coupon 846 for qualified customers. Issuing a new coupon is one of the practices to further promote products to the customers in the prior arts of coupon redemption. The initial coupon redemption process is terminated 864 around this stage. After a face is detected within the input frame, if a new coupon 846 is decided to be issued to the customer by the UCOUPON system, the face image is superimposed 272 onto the new targeted coupon contents 840, and a new coupon is issued second time.

The targeted coupon contents 840 can be personalized and matched depending on the demographic information 372 about the customers. For example, if the customer is a female adult, the coupon can be more oriented to the favorites, such as clothing or cosmetics specials of the day, of the corresponding demographic group. The demographic classification module of the UCOUPON system uses the detected face image from the customer 408 to classify 371 the demographic information 372 about the customer. The data gathering services for demographics utilize computer vision technologies to provide visibility to customer traffic, composition, and behavior. This is explained in detail by R. Sharma and A. Castellano, "Method for augmenting transaction data with visually extracted demographics of people using computer vision", U.S. Provisional Patent, 60/402,817, Aug. 12, 2002, and by R. Sharma and T. Castellano, "Automatic detection and aggregation of demographics and behavior of people using computer vision", U.S. Provisional Patent, 60/399,246, Jul. 29, 2002. One example of demographic classification for age is described in detail by R. Sharma, R. Khare, and M. Yeasin, "Methodology and system for automatic age category classification", U.S. Provisional Patent, 60/421,717, Oct. 28, 2002.

The demographic information along with the face images or the signature of the face images can be stored in the customer database 806. If the customer's record already exists in a customer database 806, the corresponding data entry is updated by the new data. The customer database 806 can be used to analyze the customer behaviors and provide valuable and important information for the marketing decisions.

After the coupon is printed 841, the customer 408 can pick up 860 the coupon. The customer can immediately redeem the coupon 862 in the UCOUPON system. In this case, the coupon can be used as a means to encourage people to visit specific sites as a way of promoting goods or services sold at the visited site, which is managed by the store traffic control 842 scheme. The coupon can be redeemed in the next visit also.

Regardless of issuing a new coupon, the UCOUPON gathers the demographic information about the customers, which can be gathered by computer vision technology, such as gender, age, or ethnicity of the customers, without requesting input from the customers. This demographic data collection is the second stage of demographics data collection. The UCOUPON system does not require any customer input or participation to gather the demographic data, and it operates fully independently and automatically as in the one-way mode.

Through this second stage of demographics data collection, the UCOUPON can gather data, which cannot be gathered in any other conventional data collection method. For example, the prior art method for data collection is possible only for returning customers, i.e. only data for the customers who redeem the coupons can be gathered. However, with the UCOUPON system, the information about those, who do not redeem the coupons, can also be gathered, by comparing the first data collection information, which was gathered in the first stage of coupon dispensing as shown in the exemplary embodiment in FIG. 4 and in FIG. 5, and the second data collection information for the returning customers as shown in the exemplary embodiment in FIG. 8. As another example, the redeem rate among different demographic groups, such as among different age groups, can be known through the data collection in UCOUPON.

Figure 9:
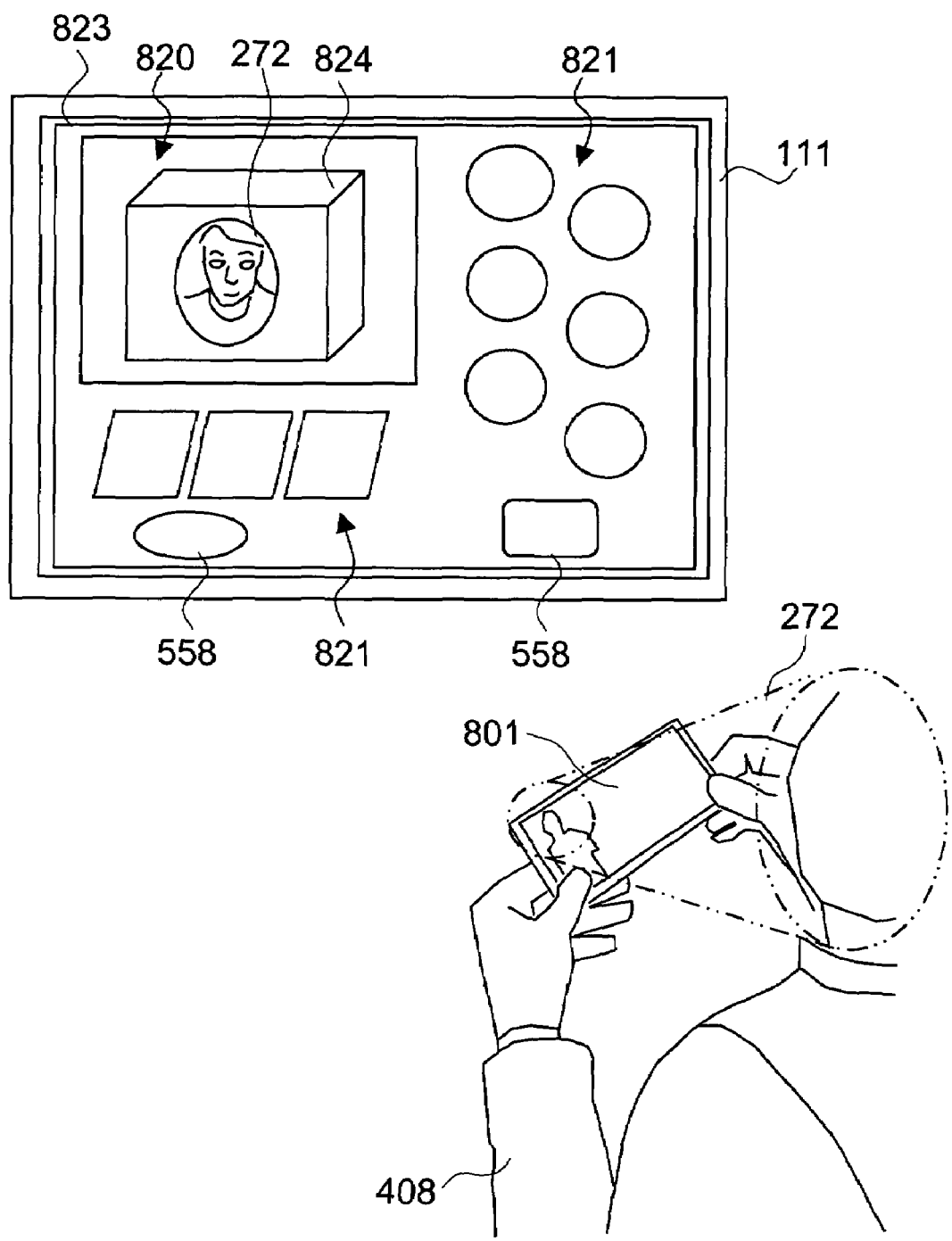
FIG. 9 shows an exemplary embodiment of the enhanced and targeted coupon content displayed on the means for displaying digital content and an exemplary embodiment of the customer face image superimposition on the promotional coupon.

FIG. 9 shows an exemplary embodiment of the enhanced and targeted coupon content 840 displayed on the means for displaying digital contents 111 and an exemplary embodiment of the customer face image superimposition on the promotional coupon.

Although the UCOUPON system is integrated into the existing business environment, and thus it can be completely hidden from the general customers, sometimes the means for displaying digital contents 111 can be a useful tool for providing rich digital content and advertisement opportunity. This is especially true in the case of the exemplary embodiment of the stand-alone UCOUPON system as shown in FIG. 2 and FIG. 5. An exemplary embodiment of the screen shot 823 on the means for displaying digital contents 111, as shown in FIG. 9, could contain product advertisement video 820 with the targeted product images 824, which is superimposed 272 by the customer's face image, list of promotional products 821, and sponsor or manufacturer logos 558. The customer 408 can look at the rich advertisement content while having fun by seeing her/his face image is superimposed 272 onto the promotional products on the means for displaying digital contents 111. Then, the customer picks up the printed UCOUPON coupons 801.

A content management team, from the owner of a specific embodiment of the UCOUPON system, can decide the content of the UCOUPON. This issue of content management is highly dependent on the business model of the specific embodiment of the UCOUPON. The content management team can also decide how the UCOUPON system finally prints out the coupons. For example, the content of the final coupon can be exact copy of the digital contents, which the customer sees on the screen. On the other hand, the content of the final coupon can be selected among other digital contents for other promotional products in the database. This is useful especially when there are many more promotional products in the list of products, which are not displayed on the screen.

Figure 10:
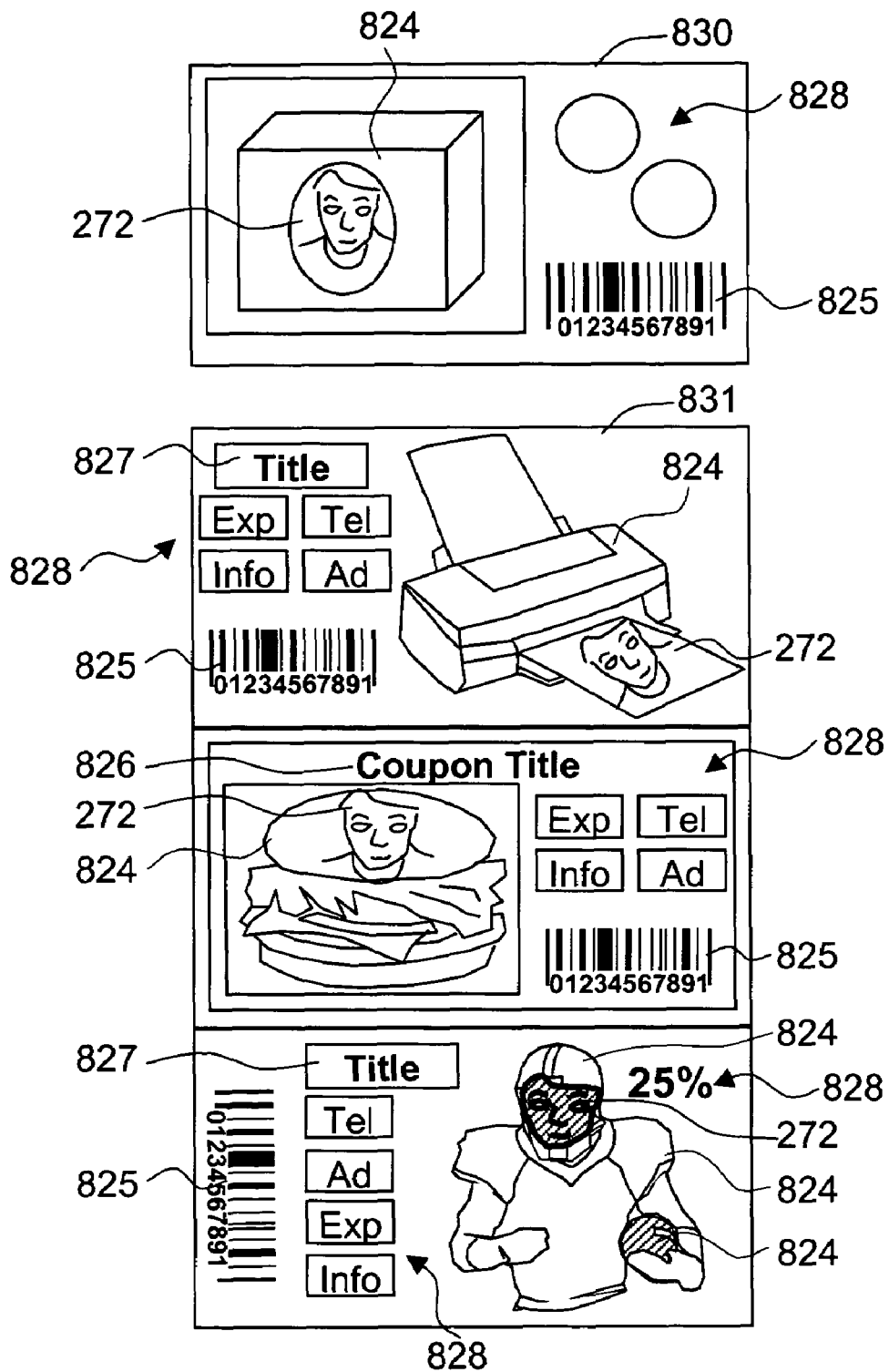
FIG. 10 shows exemplary embodiments of the coupons by the UCOUPON.

FIG. 10 shows exemplary embodiments of the coupons by the UCOUPON. As in the exemplary embodiment shown in FIG. 10, the UCOUPON coupon can be printed as a single coupon 830 or a series of coupons 831. The coupons can have the UPC bar code 825 for fast electronic management of the coupons as described in the prior arts. The coupons can have the conventional coupon features, known to the prior arts, which could include coupon title 826, product title 827, and any relevant contents and information to the coupons 828, such as discount rate and price, expiration date, telephone number for customer service, information with regard to the redemption method and other promotions, advertisement for related products or future products. However, the most important feature is the face image superimposition 272 onto the targeted product images 824 in the UCOUPON coupons. As shown in the exemplary embodiment in FIG. 10, the face image can be superimposed 272 onto various targeted product images 824, such as the electronic goods, food, clothing, sporting goods, and many others. The customers would not easily throw away coupons with their face images on them, and this superimposition is found to increase the amusement level to the customers.

While the invention has been illustrated and described in detail, in the drawings and foregoing description, such an illustration and description is to be considered as exemplary and not restrictive in character, it being understood that only the preferred embodiment has been shown and described and that all changes and modifications that come within the spirit of the invention are desired to be protected.

We claim:

1. A method for printing facial images of person or a plurality of persons, from a sequence of images automatically captured by one or a plurality of means for capturing images, onto one or a plurality of coupons or any promotional printed material, comprising the following steps of:
   a) capturing a plurality of the input images of said person or a plurality of persons in an uncontrolled background,
   b) performing the communication between a means for processing and controlling and a product database, and processing read and write transaction to said product database, c) performing the communication between a means for processing and controlling and a customer database and processing read and write transaction to said customer database;

d) processing said plurality of input images in order to superimpose the facial images of said person or said plurality of persons onto one or a plurality of said coupons or promotional printed material, e) processing demographic classification for said person or said plurality of persons using said plurality of input images, and matching the content of coupons or the promotional printed material according to a plurality of the demographic information from said demographic classification, and f) printing the coupons or the promotional printed material, whereby the promotional printed material comprises postcards, stamps, promotional brochures, and tickets for movies or shows, whereby the method is executed in any public place that requires the usage of said coupons, including existing checkout counters of a retail store environment, and whereby the method is executed in a stand alone system, including a kiosk system.

2. The method according to claim 1, wherein the method further comprises a step of processing a store traffic control by allowing immediate pickup of said coupon or immediate redemption of said coupon, wherein the store traffic control comprises a step of using said coupon to encourage said person or said plurality of persons to visit specific sites as a way of promoting goods or services sold at the visited sites.

3. The method according to claim 1, wherein the method further comprises a step of processing customer interaction by providing one or a plurality of interfaces, whereby the interfaces can comprise a keyboard, mouse, touch-screen, and contact-free interface.

4. The method according to claim 1, wherein the method further comprises a step of utilizing the data gathering services for demographics based on the computer vision technologies to provide visibility to customer traffic, composition, and behavior.

5. The method according to claim 1, wherein the method further comprises a step of executing the demographic classification and collecting the demographic data at various stages of coupon creation and redemption, wherein the various stages can comprise a stage at the time of said person detection, a stage at the time of said coupon creation, and a stage at the time of said coupon redemption.

6. The method according to claim 5, wherein the method further comprises a step of gathering the information about the customers from said plurality of demographic classification by analyzing and comparing the demographic information results from said various stages, whereby the gathered information can comprise the information not only for returning customers but also for those who do not redeem the coupons based on the analysis and comparison of the automatic demographic classification results at said various stages, and whereby the gathered information can also comprise the redemption rate among different demographic groups.

7. The method according to claim 1, wherein the method further comprises a step of generating face-based identifications of said person or said plurality of persons at the time of coupon pickup to see whether the person who picks up the coupon is the right person for the coupon or not, whereby said person or said plurality of persons do not have to carry anything to claim the coupon.

8. The method according to claim 1, wherein the method further comprises a step of verifying the legitimacy of the coupon redemption, whereby the verification prevents the problems in the paper-based conventional coupon redemption systems, including coupon fraud, duplicate redemption of the same coupon to the same customer, or inefficiency of issuing coupons to the second time customer.

9. An apparatus for printing facial images of person or a plurality of persons, from a sequence of images automatically captured by one or a plurality of means for capturing images, onto one or a plurality of coupons or any promotional printed material, comprising:

a) means for capturing a plurality of the input images of said person or a plurality of persons in an uncontrolled background, b) means for performing the communication between a means for processing and controlling and a product database, and processing read and write transaction to said product database, c) means for performing the communication between a means for processing and controlling and a customer database and processing read and write transaction to said customer database;

d) means for processing said plurality of input images in order to superimpose the facial images of said person or said plurality of persons onto one or a plurality of said coupons or promotional printed material, e) means for processing demographic classification for said person or said plurality of persons using said plurality of input images, and matching the content of coupons or the promotional printed material according to a plurality of the demographic information from said demographic classification, and f) means for printing the coupons or the promotional printed material, whereby the promotional printed material comprises postcards, stamps, promotional brochures, and tickets for movies or shows, whereby the apparatus is integrated into any public place that requires the usage of said coupons, including existing checkout counters of a retail store environment, and whereby the apparatus is integrated in a stand alone system, including a kiosk system.

10. The apparatus according to claim 9, wherein the apparatus further comprises means for processing a store traffic control by allowing immediate pickup of said coupon or immediate redemption of said coupon, wherein the store traffic control comprises means for utilizing said coupon to encourage said person or said plurality of persons to visit specific sites as a way of promoting goods or services sold at the visited sites.

11. The apparatus according to claim 9, wherein the apparatus further comprises means for processing customer interaction by one or a plurality of interfaces, whereby the interfaces can comprise a keyboard, mouse, touch-screen, and contact-free interface.

12. The apparatus according to claim 9, wherein the apparatus further comprises means for utilizing the data gathering services for demographics based on the computer vision technologies to provide visibility to customer traffic, composition, and behavior.

13. The apparatus according to claim 9, wherein the apparatus further comprises means for executing the demographic classification and collecting the demographic data at various stages of coupon creation and redemption, wherein the various stages can comprise a stage at the time of said person detection, a stage at the time of said coupon creation, and a stage at the time of said coupon redemption.

14. The apparatus according to claim 13, wherein the apparatus further comprises means for gathering the information about the customers from said plurality of demographic classification by analyzing and comparing the demographic information results from said various stages, whereby the gathered information can comprise the information not only for returning customers, but also for those who do not redeem the coupons, based on the analysis and comparison of the automatic demographic classification results at said various stages, and whereby the gathered information can also comprise the redemption rate among different demographic groups.

15. The apparatus according to claim 9, wherein the apparatus further comprises means for generating face-based identifications of said person or said plurality of persons at the time of coupon pickup to see whether the person who picks up the coupon is the right person for the coupon or not, whereby said person or said plurality of persons do not have to carry anything to claim the coupon.

16. The apparatus according to claim 8, wherein the apparatus further comprises means for verifying the legitimacy of the coupon redemption, whereby the verification prevents the problems in the paper-based conventional coupon redemption systems, including coupon fraud, duplicate redemption of the same coupon to the same customer, or inefficiency of issuing coupons to the second time customer.

* * * * *

UNITED STATES PATENT AND TRADEMARK OFFICE
CERTIFICATE OF CORRECTION

PATENT NO. : 7,283,650 B1 Page 1 of 1
APPLICATION NO. : 10/724302
DATED : October 16, 2007
INVENTOR(S) : Rajeev Sharma and Namsoon Jung It is certified that error appears in the above-identified patent and that said Letters Patent is hereby corrected as shown below:

On the title page, item [73], should read:
Assignee: VideoMining Corporation, State College, PA (US)

Signed and Sealed this

Eighth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,283,650 B1
APPLICATION NO. : 10/724302
DATED : October 16, 2007
INVENTOR(S) : Rajeev Sharma et al.

It is certified that error appears in the above-identified patent and that said Letters Patent is hereby corrected as shown below:

In the claims:

Claim 1, col. 18, line 57, please delete "of person" and substitute therefore --of a person--.

Claim 1, col. 18, line 62, please delete the word "the".

Claim 1, col. 18, line 63, please delete "a plurality" and substitute therefore --said plurality--.

Claim 1, col. 18, line 64, please delete "the communication" and substitute therefore --a communication--.

Claim 1, col. 18, line 66, please delete "processing read" and substitute therefore --processing a read--.

Claim 1, col. 19, line 1, please delete "the communication" and substitute therefore --a communication--.

Claim 1, col. 19, line 1, please delete "a means" and substitute therefore --said means--.

Claim 1, col. 19, line 3, please delete "processing read" and substitute therefore --processing a read--.

Claim 1, col. 19, line 4, please delete ";" and substitute therefore --,--.

Claim 1, col. 19, line 21, please delete the word "the".

Claim 2, col. 19, line 27, please delete "coupon" and substitute therefore --coupons--.

Claim 2, col. 19, line 28, please delete "coupon" and substitute therefore --coupons--.

Claim 2, col. 19, line 30, please delete "coupon" and substitute therefore --coupons--.

UNITED STATES PATENT AND TRADEMARK OFFICE
CERTIFICATE OF CORRECTION

| | |
|---|---|
| PATENT NO. | : 7,283,650 B1 |
| APPLICATION NO. | : 10/724302 |
| DATED | : October 16, 2007 |
| INVENTOR(S) | : Rajeev Sharma et al. |

It is certified that error appears in the above-identified patent and that said Letters Patent is hereby corrected as shown below:

In the claims (continued):

Claim 3, col. 19, lines 36-37, please delete "can comprise a keyboard, mouse, touch-screen, and contact-free" and substitute therefore --comprise at least one of a keyboard, a mouse, a touch-screen, and a contact-free--.

Claim 4, col. 19, line 39, please delete the word "the".

Claim 4, col. 19, line 40, please delete the word "the".

Claim 5, col. 19, line 44, please delete the word "the".

Claim 5, col. 19, line 47, please delete the word "can".

Claim 5, col. 19, line 47, please delete the word "the" and substitute therefore --a--.

Claim 5, col. 19, line 48, please delete both occurrences of the word "said".

Claim 5, col. 19, line 48, please delete the word "the" and substitute therefore --a--.

Claim 5, col. 19, line 49, please delete the word "the" and substitute therefore --a--.

Claim 5, col. 19, line 49, please delete the word "said".

Claim 6, col. 19, line 52, please delete the word "the".

Claim 6, col. 19, line 53, please delete the word "the".

Claim 6, col. 19, line 53, please delete "plurality of".

Claim 6, col. 19, line 54, please delete the word "the".

Claim 6, col. 19, line 56, please delete "can comprise the" and substitute therefore --comprises--.

UNITED STATES PATENT AND TRADEMARK OFFICE
CERTIFICATE OF CORRECTION

| | |
|---|---|
| PATENT NO. | : 7,283,650 B1 |
| APPLICATION NO. | : 10/724302 |
| DATED | : October 16, 2007 |
| INVENTOR(S) | : Rajeev Sharma et al. |

It is certified that error appears in the above-identified patent and that said Letters Patent is hereby corrected as shown below:

In the claims (continued):

Claim 6, col. 19, line 58, please delete "those" and substitute therefore --customers--.

Claim 6, col. 19, line 58, please delete both occurrences of the word "the".

Claim 6, col. 19, line 59, please delete "the automatic".

Claim 6, col. 19, line 61, please delete "can also comprise the" and substitute therefore --further comprises a--.

Claim 7, col. 19, line 65, please delete the word "the" and substitute therefore --a--.

Claim 7, col. 19, line 66, please delete the first occurrence of word "the" and substitute therefore --a--.

Claim 7, col. 19, line 66, please delete the second occurrence of word "the" and substitute therefore --a--.

Claim 7, col. 19, line 67, please delete the first occurrence of word "the" and substitute therefore --a--.

Claim 8, col. 20, line 4, please delete the first occurrence of the word "the".

Claim 8, col. 20, line 4, please delete the second occurrence of the word "the" and substitute therefore --a--.

Claim 8, col. 20, line 6, please delete all three occurrences of the word "the".

Claim 8, col. 20, line 8, please delete "the" and substitute therefore --a--.

Claim 8, col. 20, line 9, please delete "the" and substitute therefore --a--.

Claim 8, col. 20, line 10, please delete "the" and substitute therefore --a--.

UNITED STATES PATENT AND TRADEMARK OFFICE
CERTIFICATE OF CORRECTION

PATENT NO.       : 7,283,650 B1
APPLICATION NO.  : 10/724302
DATED            : October 16, 2007
INVENTOR(S)      : Rajeev Sharma et al.

It is certified that error appears in the above-identified patent and that said Letters Patent is hereby corrected as shown below:

In the claims (continued):

Claim 9, col. 20, line 11, please delete "of person" and substitute therefore --of a person--.

Claim 9, col. 20, line 16, please delete the word "the".

Claim 9, col. 20, line 17, please delete "a plurality" and substitute therefore --said plurality--.

Claim 9, col. 20, line 19, please delete "the communication" and substitute therefore --a communication--.

Claim 9, col. 20, line 21, please delete "processing read" and substitute therefore --processing a read--.

Claim 9, col. 20, line 23, please delete "the communication" and substitute therefore --a communication--.

Claim 9, col. 20, line 23, please delete "between a" and substitute therefore --between said--.

Claim 9, col. 20, line 25, please delete "processing read" and substitute therefore --processing a read--.

Claim 9, col. 20, line 26, please delete ";" and substitute therefore --,--.

Claim 9, col. 20, line 43, please delete the word "the".

Claim 10, col. 20, line 49, please delete the word "coupon" and substitute therefore --coupons--.

Claim 10, col. 20, line 50, please delete the word "coupon" and substitute therefore --coupons--.

Claim 10, col. 20, line 52, please delete the word "coupon" and substitute therefore --coupons--.

UNITED STATES PATENT AND TRADEMARK OFFICE
CERTIFICATE OF CORRECTION

| PATENT NO. | : 7,283,650 B1 |
|---|---|
| APPLICATION NO. | : 10/724302 |
| DATED | : October 16, 2007 |
| INVENTOR(S) | : Rajeev Sharma et al. |

It is certified that error appears in the above-identified patent and that said Letters Patent is hereby corrected as shown below:

In the claims (continued):

Claim 11, col. 20, lines 58-59, please delete "can comprise a keyboard, mouse, touch-screen, and contact-free" and substitute therefore --comprise at least one of a keyboard, a mouse, a touch-screen, and a contact-free--.

Claim 12, col. 20, line 61, please delete the word "the".

Claim 12, col. 20, line 62, please delete the word "the".

Claim 13, col. 20, line 67, please delete the word "the".

Claim 13, col. 21, line 2, please delete the word "can".

Claim 13, col. 21, line 2, please delete the word "the" and substitute therefore --a--.

Claim 13, col. 21, line 2, please delete the word "said".

Claim 13, col. 21, line 3, please delete the words "the time of said coupon" and substitute therefore --a time of coupon--.

Claim 13, col. 21, line 4, please delete the words "the time of said coupon" and substitute therefore --a time of coupon--.

Claim 14, col. 21, line 6, please delete the word "the".

Claim 14, col. 21, line 7, please delete the word "the".

Claim 14, col. 21, line 7, please delete "plurality of".

Claim 14, col. 21, line 8, please delete the word "the".

Claim 14, col. 21, line 10, please delete "can comprise the" and substitute therefore --comprises--.

Claim 14, col. 21, line 12, please delete "those" and substitute therefore --customers--.

UNITED STATES PATENT AND TRADEMARK OFFICE
CERTIFICATE OF CORRECTION

| | | |
|---|---|---|
| PATENT NO. | : 7,283,650 B1 | Page 6 of 7 |
| APPLICATION NO. | : 10/724302 | |
| DATED | : October 16, 2007 | |
| INVENTOR(S) | : Rajeev Sharma et al. | |

It is certified that error appears in the above-identified patent and that said Letters Patent is hereby corrected as shown below:

In the claims (continued):

Claim 14, col. 21, line 12, please delete both occurrences of the word "the".

Claim 14, col. 21, line 13, please delete "the automatic".

Claim 14, col. 21, line 15, please delete "can also comprise the" and substitute therefore --further comprises a--.

Claim 15, col. 22, line 2, please delete the first occurrence of the word "the" and substitute therefore --a--.

Claim 15, col. 22, line 2, please delete the second occurrence of the word "the" and substitute therefore --a--.

Claim 15, col. 22, line 3, please delete the first occurrence of the word "the" and substitute therefore --a--.

Claim 15, col. 22, line 3, please delete the second occurrence of the word "the" and substitute therefore --a--.

Claim 16, col. 22, line 8, please delete the number "8" and substitute therefore --9--.

Claim 16, col. 22, line 9, please delete the word "the".

Claim 16, col. 22, line 10, please delete the word "the" and substitute therefore --a--.

Claim 16, col. 22, line 11, please delete all three occurrences of the word "the".

Claim 16, col. 22, line 14, please delete the word "the" and substitute therefore --a--.

Claim 16, col. 22, line 15, please delete the word "the" and substitute therefore --a--.

UNITED STATES PATENT AND TRADEMARK OFFICE
CERTIFICATE OF CORRECTION

PATENT NO. : 7,283,650 B1
APPLICATION NO. : 10/724302
DATED : October 16, 2007
INVENTOR(S) : Rajeev Sharma et al.

It is certified that error appears in the above-identified patent and that said Letters Patent is hereby corrected as shown below:

In the claims (continued):

Claim 16, col. 22, line 16, please delete the word "the" and substitute therefore --a--.

Signed and Sealed this

Seventeenth Day of November, 2009

David J. Kappos
*Director of the United States Patent and Trademark Office*